United States Patent
Dickerson et al.

(10) Patent No.: US 10,719,818 B2
(45) Date of Patent: Jul. 21, 2020

(54) PERSONAL BUDGET TOOL

(75) Inventors: Joseph Carl Dickerson, Dacula, GA (US); Barbara Wilson Whiteside, Snellville, GA (US)

(73) Assignee: FISERV, INC., Brookfield, WI (US)

( * ) Notice: Subject to any disclaimer, the term of this patent is extended or adjusted under 35 U.S.C. 154(b) by 811 days.

(21) Appl. No.: 12/967,434

(22) Filed: Dec. 14, 2010

(65) Prior Publication Data

US 2012/0150736 A1    Jun. 14, 2012

(51) Int. Cl.
*G06Q 20/10* (2012.01)
*G06Q 40/02* (2012.01)
*G06Q 20/40* (2012.01)

(52) U.S. Cl.
CPC ......... *G06Q 20/102* (2013.01); *G06Q 20/405* (2013.01); *G06Q 40/02* (2013.01)

(58) Field of Classification Search
CPC ...... G06Q 20/102; G06Q 20/14; G06Q 40/12; G06Q 30/04; G06Q 20/04; G06Q 20/02; G06Q 40/02; G06Q 20/405; G07F 19/00; F24F 2011/0071; F24F 2011/0075
See application file for complete search history.

(56) References Cited

U.S. PATENT DOCUMENTS

| | | | | |
|---|---|---|---|---|
| 8,296,206 B1 * | 10/2012 | Del Favero | ............ | G06Q 40/02 705/1.1 |
| 2002/0123949 A1 * | 9/2002 | VanLeeuwen | .................. | 705/35 |
| 2004/0254835 A1 * | 12/2004 | Thomas | ................ | G06Q 20/10 705/14.18 |
| 2009/0094156 A1 * | 4/2009 | Wright | .................. | G06Q 20/04 705/40 |
| 2009/0204529 A1 * | 8/2009 | Warsaw et al. | .................. | 705/35 |
| 2010/0114748 A1 * | 5/2010 | Duke et al. | .................... | 705/35 |
| 2010/0217706 A1 * | 8/2010 | Griffin | ................ | G06Q 20/102 705/40 |
| 2010/0241487 A1 | 9/2010 | Wolfson et al. | | |
| 2010/0241547 A1 | 9/2010 | Wolfson et al. | | |
| 2012/0130869 A1 * | 5/2012 | Shergill et al. | ................. | 705/30 |

FOREIGN PATENT DOCUMENTS

| | | | | | |
|---|---|---|---|---|---|
| EP | | 1049056 A2 * | 11/2000 | ............ | G06Q 20/04 |
| WO | WO2007121521 | * | 1/2007 | ............ | G06Q 30/00 |

* cited by examiner

*Primary Examiner* — Namrata Boveja
*Assistant Examiner* — Carol A See
(74) *Attorney, Agent, or Firm* — Alston & Bird LLP

(57) ABSTRACT

Systems and methods for generating proposed budget amounts by a budget tool are provided. A budget system identifies a budget category for a user. Information associated with one or more payees of the user and payment history information associated with one or more payments made to a payee included in the one or more payees is obtained from a bill payment system. Based at least in part on the obtained information, the payee is identified by the budget system as a budget payee associated with the budget category. Based at least in part on the identified payment history information, a proposed budget amount for the budget payee is calculated. A presentation is generated that includes an indication of the budget category, an indication of the budget payee, and an indication of the proposed budget amount. The generated presentation is transmitted by the budget system for display to the user.

22 Claims, 12 Drawing Sheets

Budget Builder  X

Now, adjust the "starter amounts" for each of your budget items for your monthly bills – we will auto-categorize your spending to match your budget items AND check to see if you can get these bills delivered here!

How does this work?

505

Monthly Bills

| Category | Biller | Budget Amount |
|---|---|---|
| Rent/Housing | Mortgage Co. ▼ | $ 1210 |
| Electricity | Select ▼ | $ |
| Car Payment | Auto Co. ▼ | $ 429 |
| Water | Select ▼ | $ |
| Natural Gas | Gas Provider ▼ | $ 89 |
| Credit Card | Select ▼ | $ |
| Cellular Phone | Mobile Provider ▼ | $ 87 |

510        515

Our privacy policy                            Next

PERSONAL BUDGET TOOL

FIELD OF THE INVENTION

Aspects of the invention relate generally to personal budgeting, and more particularly, to a personal budget tool that is capable of integrating with an electronic bill payment and presentment service.

BACKGROUND OF THE INVENTION

A wide variety of budgeting software and budgeting tools are available to assist users in the management of personal finances. However, conventional budgeting tools typically require users to manually enter information for all of their billers. These conventional budgeting tools do not integrate with electronic bill presentment and payment functionality, such as online bill payment and presentment services. Additionally, these conventional budgeting tools do not integrate with online banking functionality.

BRIEF DESCRIPTION OF THE DRAWINGS

Reference will now be made to the accompanying drawings, which are not necessarily drawn to scale, and wherein:

FIG. 5 is an example graphical user interface that may be utilized to collect payee information associated with a budget, according to an illustrative embodiment of the invention.

DETAILED DESCRIPTION

The invention will now be described more fully hereinafter with reference to the accompanying drawings, in which example embodiments of the invention are shown. This invention may, however, be embodied in many different forms and should not be construed as limited to the example embodiments set forth herein; rather, these example embodiments are provided so that this disclosure will be thorough and complete, and will fully convey the scope of the invention to those of ordinary skill in the art. Like numbers refer to like elements throughout.

Embodiments of the invention may provide systems and methods for integrating the operations of a budget tool or budget system and an electronic bill presentment and payment ("EBPP") system. In certain embodiments, the budget system may facilitate the establishment, maintenance, and/or modification of a budget for a user. Additionally, an EBPP system may facilitate the provision of electronic bill presentment and/or payment services to the user. In accordance with an aspect of the invention, information may be shared between the budget system and the EBPP system. For example, the budget system may obtain, from the EBPP system, information associated with one or more EBPP payees of the user, and the budget system may utilize the information to identify payees to include in a budget. The budget system may also obtain historical billing and/or payment information that may be utilized to propose budget amounts for one or more payees or categories. As another example, the EBPP system may obtain, from the budget system, information associated with a budget that has been established for the user. At least a portion of the obtained budget information may be presented to the user in association with EBPP data and, as desired, any number of suggestions may be made to the user based at least in part upon the budget information.

I. System Overview

Figure 1:
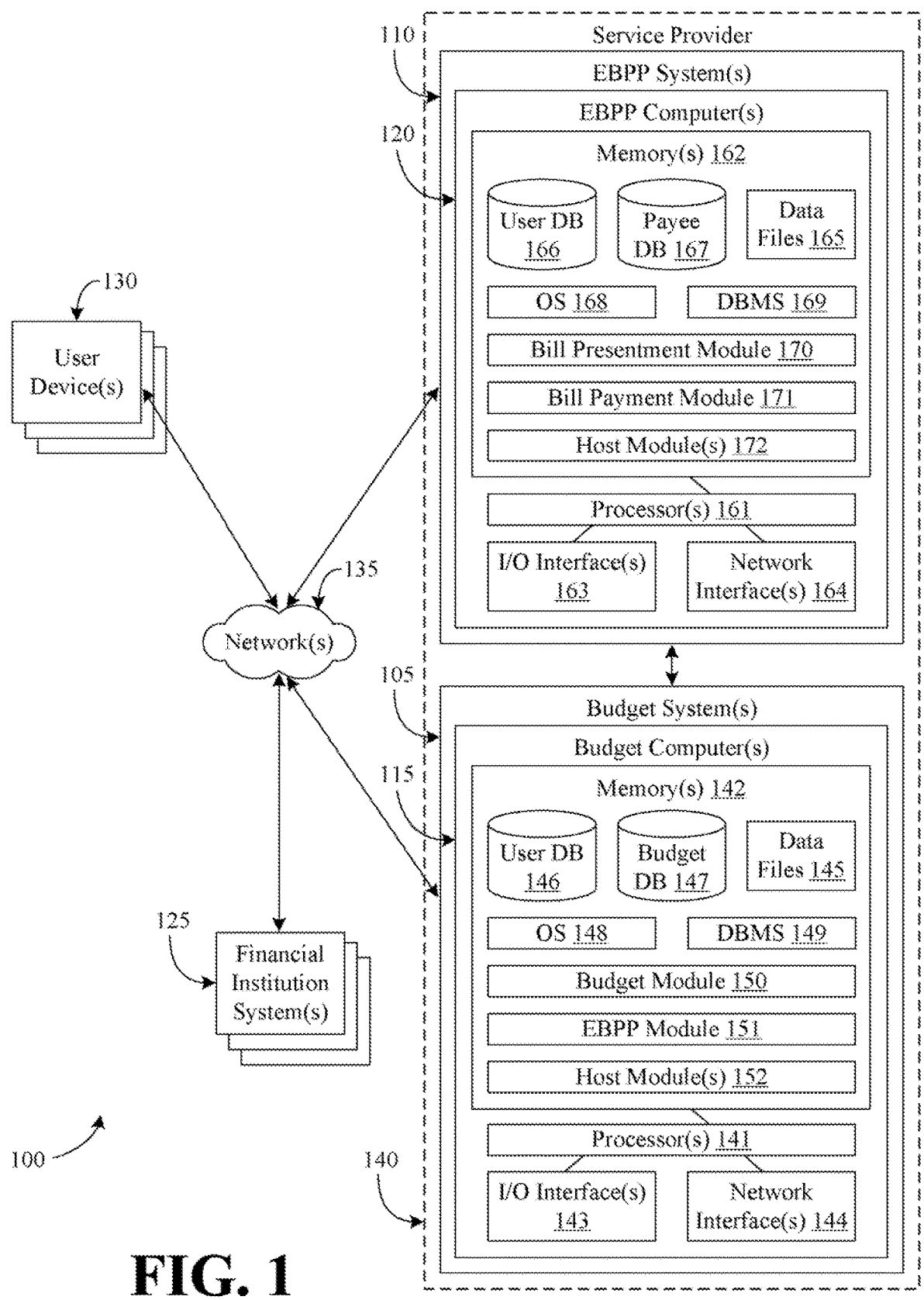
FIG. 1 is a block diagram of an example system that facilitates the provision of budgeting services, according to an example embodiment of the invention.

FIG. 1 illustrates an overview of an example system 100 that facilitates the provision of budgeting services and/or EBPP services, according to an example embodiment of the invention. Although various computing devices and/or computers are illustrated in FIG. 1, it is appreciated that corresponding entities and/or individuals are associated with each of the computers illustrated. According to various embodiments, one or more budget systems 105 and one or more EBPP systems 110 may be provided. The one or more budget systems 105 may be associated with one or more budget computers 115. Similarly, the one or more EBPP systems 110 may be associated with one or more EBPP computers 120. Additionally, one or more financial institution systems 125 may be provided. Each of the financial institution systems 125 may include any number of financial institution computers. Additionally, each of the financial institution systems may be associated with a financial institution, such as a bank. With continued reference to FIG. 1, one or more user devices 130 may be provided. Each user device 130 may be a suitable processor-driven device (e.g., a computer, a mobile device, etc.) associated with a user. Additionally, each user device 130 may facilitate user access to one or more services provided by the budget system 105, the EBPP system 110, and/or the financial institution systems 125. For simplicity, the computers, devices, and/or entities illustrated in FIG. 1 may be referenced in the singular, but it is appreciated that the same description applies to embodiments including multiple computers, devices and/or entities. Similarly, for each of the computers described herein, it is appreciated that the computer may include any number of suitable components and/or functionality.

As shown in FIG. 1, one or more of the budget system(s) 105, the EBPP system(s) 110, the financial institution system(s) 125, and the user device(s) 130 may be in communication with each other via any number of suitable networks 135, which, as described below, can include one or more separate or shared private and/or public networks, including the Internet or a publicly switched telephone network. More specifically, according to various embodiments, a user may utilize a user device 130 to access one or more services provided by other components of the system 100. For example, the user may utilize the user device 130 to access budgeting services provided by the budget system 105 and/or to access EBPP services provided by the EBPP system 110. To facilitate the provision of one or more services to a user, one or more network communications sessions may be established between the user device 130 and one or more other components of the system.

As desired, the budget system 105, the EBPP system 110, and/or the financial institution system(s) 125 may be associated with one or more service providers. For example, as illustrated in FIG. 1, both the budget system 105 and the EBPP system 110 may be associated with the same service provider 140. The service provider 140 may provide any number of online services to one or more customers. In certain embodiments, the service provider 140 may directly provide one or more services to customers or subscribers that access one or more service provider systems. For example, a customer or subscriber may directly access the budget system 105 and/or the EBPP system 110. In other embodiments, the service provider 140 may operate behind the scenes to provide services to customers of one or more other entities. For example, a financial institution may contract with the service provider 140 to provide budgeting and/or EBPP services to customers of the financial institution. A customer of the financial institution may access online banking services provided by the financial institution system 125 (or a service provider hosted system). Based upon a request to access budgeting and/or EBPP services, the customer may be redirected by the financial institution system 125 to the budget system 105 and/or the EBPP system 110. In certain embodiments, the redirection may be transparent to the customer. In other words, it may appear to the customer that services are continuing to be provided by the financial institution system 125. As desired, the budgeting and/or EBPP services provided to the customer may be branded in accordance with various preferences of the financial institution.

Although the budget system 105 and the EBPP system 110 are described as being associated with a single service provider 140, the two systems may be associated with any number of service providers. Additionally, in certain embodiments, the budget system 105 and the EBPP system 110 may be combined into a single system. For example, various software modules may facilitate the provision of budgeting and EBPP services, and information may be shared between the software modules utilizing any number of suitable application service calls and/or requests. In other embodiments, at least one of the budget system 105 and/or the EBPP system 110 may be operated and/or maintained by a financial institution. For example, the budget system 105 and/or the EBPP system 110 may be incorporated into a financial institution system 125. In yet other embodiments, online banking functionality may be provided by a service provider on behalf of a financial institution. As desired, the online banking functionality may be integrated with EBPP functionality and/or budgeting functionality. Indeed, the various components of the system 100 may be integrated and/or distributed in a wide variety of different ways.

With reference to the budget system 105 of FIG. 1, the budget system may include any number of budget computers 115. A budget computer 115 may be any suitable processor-driven device that facilitates the provision of budgeting services to one or more users, such as a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the budget computer 115 may form a special purpose computer or other particular machine that is operable to facilitate the provision of one or more budgeting services. Additionally, a special purpose computer or other particular machine may be formed that is operable to integrate with EBPP functionality in order to provide one or more budgeting services. Although a single budget computer 115 is described herein, the operations and/or control of the budget computer 115 may be distributed among any number of computers and/or processing components.

In addition to having one or more processors 141, the budget computer 115 may include one or more memory devices 142, one or more input/output ("I/O") interfaces 143, and one or more network interfaces 144. The memory devices 142 may be any suitable memory devices, for example, caches, read-only memory devices, random access memory devices, magnetic storage devices, removable storage devices, etc. Additionally, any number of logical data storage constructs may be stored as desired within the memory devices 142, such as any number of suitable databases. The memory devices 142 may store a wide variety of data, such as data files 145, a user database 146, and/or a budget database 147. Additionally, the memory devices 142 may store executable instructions and/or various program modules utilized by the budget computer 115, for example, an operating system ("OS") 148, a database management system ("DBMS") 149, a budget module 150, an EBPP module 151, and/or one or more host modules 152.

The data files 145 may include any suitable data that facilitates the operations of the budget computer 115 and/or the provision of budgeting services to one or more users. For example, the data files 145 may include data associated with one or more budgeting services, data that facilitates the calculation of budgeting amounts, data associated with one or more budget presentations and/or graphical user interfaces, data that facilitates interaction with any number of other systems and/or components (e.g., the EBPP system 110, a financial institution system 125, an online banking system, etc.), data associated with financial planning tools, etc. The user database 146 may include data associated with one or more users of the budget system 105 or subscribers to the budget system 105. For example, the user database 146 may include user contact information, information associated with user preferences for providing budgeting services, information associated with payees and/or billers for various users, indications of whether users are customers of the EBPP system 110, and/or information associated with EBPP services for which users are enrolled. The budget database 147 may include data associated with one or more budgeting services provided by the budget system, such as information associated with budget periods and/or budgeted amounts, information associated with income streams for users, information associated with budget payees or billers for users, and/or information associated with links or established connections between budget payees and corresponding EBPP payees. Any number of databases may be utilized as desired in various embodiments. For example, in certain embodiments, the budget database 147 and the user database 146 may be combined into a single database. In other embodiments, additional databases may be utilized.

The OS 148 may be a suitable software module that controls the general operation of the budget computer 115. The OS 148 may also facilitate the execution of other software modules by the one or more processors 141, for example, the DBMS 149, the budget module 150, the EBPP module 151, and/or the host modules 152. The OS 148 may be, but is not limited to, Microsoft Windows®, Apple OSX™, Linux, Unix, or a mainframe operating system. The DBMS 149 may be a suitable software module or application that facilitates the management of one or more databases, such as the user database 146 and/or the budget database 147. The DBMS 149 may facilitate the access of stored information included in the databases and/or the writing of information to the databases. Additionally, in certain embodiments, the DBMS 149 may facilitate the access of information stored in one or more external databases, such as one or more databases associated with the EBPP system 110.

The budget module 150 may be a suitable software module that facilitates the provision of any number of budgeting services to one or more users. For example, the budget module 150 may facilitate the generation, management, and/or modification of budgets. In operation, the budget module 150 may receive a user request to establish a budget for the user. The budget module 150 may then assist the user in generating a budget by establishing a budget period, one or more income streams, and/or one or more expenses, such as expenses paid to various payees and/or billers. In certain embodiments, the budget module 150 and/or the EBPP module 151 may interact with the EBPP system 110 in order to collect or obtain information associated with one or more payees of the user. For example, information associated with one or more EBPP payees established at the EBPP system 110 for the user may be obtained. In this regard, the budget module 150 may assist the user in preparing a budget. For example, the budget module 150 may identify payees and/or probable payees for the user. The budget module 150 may additionally propose budget amounts associated with various payees. As desired, the budget module 150 may generate any number of presentations that facilitate the collection and/or confirmation of budget information for users.

Once a budget has been generated for a user, the budget module 150 may assist the user in the management and/or modification of the budget. For example, the budget module 150 may assist the user in tracking expenses in order to determine whether the user is living within his/her means and/or achieving any number of desired goals (e.g., savings goals). Additionally, the budget module 150 and/or the EBPP module 151 may interact with the EBPP system 110 in order to collect payment history information associated with one or more budget payees. Based at least in part on the collected information, the budget module 150 may generate one or more proposed modifications to the budget, such as proposals for revising budgeted amounts.

A few examples of the operations that may be performed by the budget module 150 are described in greater detail below with reference to FIGS. 2-10. However, the described operations are provided by way of example only. The budget module 150 may perform a wide variety of tasks in addition to those described.

The EBPP module 151 may facilitate interaction between the budget computer 115 and the EBPP system 110. For example, the EBPP module 151 may transmit or communicate requests for EBPP information associated with one or more users to the EBPP system 110. As another example, the EBPP module 151 may generate application service calls that are communicated to the EBPP system 110. In this regard, integration and/or interaction between the budget system 105 and the EBPP system 110 may be facilitated. For example, information associated with EBPP payees, payment history information, billing information, and/or EBPP services associated with one or more users may be obtained by the EBPP module 151 and utilized by the budget module 150 in the provision of budgeting services. Although a separate EBPP module 151 is illustrated in association with the budget computer 115, the described functionality of the EBPP module 151 may be performed by other modules as desired, such as the budget module 150.

Additionally, in various embodiments of the invention, the EBPP module 151 and/or the budget module 150 may establish any number of links between budget payees and associated EBPP payees. A wide variety of suitable types of links may be utilized as desired in various embodiments. For example, an established link may include access information that may be utilized by the budget system 105 to obtain, for a budget payee, information (e.g., payment history information, billing information, etc.) associated with a corresponding EBPP payee of the user. As another example, an established link may simply include an indication that an EBPP payee is associated with a budget payee. Accordingly, the EBPP module 151 may request EBPP information based upon the recognition of an established link.

The host module(s) 152 may facilitate interaction between the budget system 105 and any number of users. For example, a user may utilize a user device 130 to access a host module 152 and request budgeting services. The host module(s) 152 may include any number of suitable host modules, such as Web servers, email servers, and/or short message service ("SMS") processing applications, including various dedicated applications, that facilitate interaction with any number of user devices 130.

With continued reference to the budget computer 115, the one or more I/O interfaces 143 may facilitate communication between the budget computer 115 and one or more input/output devices, for example, one or more user interface devices, such as a display, keypad, mouse, pointing device, control panel, touch screen display, remote control, microphone, speaker, etc., that facilitate user interaction with the budget computer 115. The I/O devices may be utilized, for example, by operational support personnel and/or programmers to enter information into the budget computer 115 and/or to maintain the budget computer. The one or more network interfaces 144 may facilitate connection of the budget computer 115 to one or more suitable networks, for example, the networks 135 illustrated in FIG. 1. In this regard, the budget computer 115 may receive and/or communicate information to other components of the system 100, such as the EBPP system 110, the financial institution system 125, and/or the user devices 130.

With continued reference to FIG. 1, the EBPP system 110 may include any number of EBPP computers 120. An EBPP computer 120 may be any suitable processor-driven device that facilitates the provision of electronic bill presentment and/or payment services to one or more users, such as a server computer, a mainframe computer, one or more networked computers, a desktop computer, a personal computer, a digital assistant, a personal digital assistant, a digital tablet, an Internet appliance, an application-specific circuit, a microcontroller, a minicomputer, or any other processor-based device. The execution of suitable computer-implemented instructions by the EBPP computer 120 may form a special purpose computer or other particular machine that is operable to facilitate the provision of one or more EBPP services. Additionally, a special purpose computer or other particular machine may be formed that is operable to integrate with budgeting functionality in order to provide one or more enhanced EBPP services. Although a single EBPP computer 120 is described herein, the operations and/or control of the EBPP computer 120 may be distributed among any number of computers and/or processing components.

In addition to having one or more processors 161, the EBPP computer 120 may include one or more memory devices 162, one or more input/output ("I/O") interfaces 163, and one or more network interfaces 164. The memory devices 162 may be any suitable memory devices, for example, caches, read-only memory devices, random access memory devices, magnetic storage devices, removable storage devices, etc. Additionally, any number of logical data storage constructs may be stored as desired within the memory devices 162, such as any number of suitable databases. The memory devices 162 may store a wide variety of data, such as data files 165, a user database 166, and/or a payee database 167. Additionally, the memory devices 162 may store executable instructions and/or various program modules utilized by the EBPP computer 120, for example, an operating system ("OS") 168, a database management system ("DBMS") 169, a bill presentment module 170, a bill payment module 171, and/or one or more host modules 172.

The data files 165 may include any suitable data that facilitates the operations of the EBPP computer 120 and/or the provision of EBPP services to one or more users. For example, the data files 165 may include data associated with one or more EBPP services (e.g., electronic bill presentment services, electronic bill payment services, etc.), data that facilitates the receipt and/or processing of payment requests, data associated with one or more EBPP presentations and/or graphical user interfaces, data that facilitates interaction with any number of other systems and/or components (e.g., the budget system 105, a financial institution system 125, an online banking system, etc.), and/or other suitable data. The user database 166 may include data associated with one or more users of the EBPP system 110 or subscribers to the EBPP system 110. For example, the user database 166 may include user contact information, information associated with user preferences for providing EBPP services, information associated with payee lists for various users, information associated with payment preferences for users (e.g., recurring payments, desired payment lead time, etc.), and/or indications of whether users are customers of the budget system 105. The payee database 167 may include data associated with one or more payees and/or billers from which billing information may be received and/or to whom payments may be made. For example, the payee database 167 may include contact information for EBPP payees, remittance information for EBPP payees, information associated with customers of one or more payees and/or billers, current billing information, historical billing information, information associated with pending payments, and/or information associated with historical payments that have been made to one or more payees. Any number of databases may be utilized as desired in various embodiments. Additionally, the information stored in the various databases may be customized as desired in various embodiments of the invention.

The OS 168 may be a suitable software module that controls the general operation of the EBPP computer 120. The OS 168 may also facilitate the execution of other software modules by the one or more processors 161, for example, the DBMS 169, the bill presentment module 170, the bill payment module 171, and/or the host modules 172. The OS 168 may be, but is not limited to, Microsoft Windows®, Apple OSX™, Linux, Unix, or a mainframe operating system. The DBMS 169 may be a suitable software module or application that facilitates the management of one or more databases, such as the user database 166 and/or the payee database 167. The DBMS 169 may facilitate the access of stored information included in the databases and/or the writing of information to the databases. Additionally, in certain embodiments, the DBMS 169 may facilitate the access of information stored in one or more external databases, such as one or more databases associated with the budget system 105.

The bill presentment module 170 may be a suitable software module or application that facilitates the provision of one or more electronic bill presentment services to users. In one example operation, the bill presentment module 170 may receive billing information from one or more billers or payees of a user, and the bill presentment module 170 may format at least a portion of the received information for presentation to the user. The bill presentment module 170 may generate presentations for bill summary information and/or detailed billing information. Upon request, the bill presentment module 170 may direct the transmission or communication of one or more presentations to a user device 130 for display to the user. Additionally, the bill presentment module 170 may track and/or store historical information associated with billing information for the user.

Similarly, the bill payment module 171 may be a suitable software module or application that facilitates the provision of one or more payment services. In one example operation, the bill payment module 171 may establish one or more EBPP payees for a user, including payees that are electronically paid by the EBPP system 110 and/or payees to which paper drafts (e.g., paper checks) are mailed by the EBPP system 110 on behalf of the user. Based upon the receipt of a user request to submit a payment to an EBPP payee, such as a request including a desired payment amount and a desired payment date, the bill payment module 171 may direct the submission of a payment on behalf of the user. In certain embodiments, one or more recurring payments may be established for the user. Additionally, the bill payment module 171 may track and/or store historical information associated with payments that are made on behalf of the user.

In certain embodiments of the invention, the bill presentment module 170 and/or the bill payment module 171 may interact with the budget system 105. Alternatively, a separate budget interaction module may be provided to facilitate interaction with the budget system 105. In one example embodiment, the bill presentment module 170 and/or the bill payment module 171 may receive an indication or selection of an EBPP payee or biller. Based upon the received indication, a determination may be made as to whether a link has been established for the EBPP payee to a corresponding budget payee. In the event that a link has been established, budget information may be obtained from the budget system 105 and at least a portion of the obtained budget information may be utilized to generate one or more presentations or graphical user interfaces that are communicated for presentation to a user. A few examples of the operations that may be performed by the bill presentment module 170 and/or the bill payment module 171 are described in greater detail below with reference to FIGS. 11-12. However, the described operations are provided by way of example only. As desired, the modules may perform a wide variety of tasks in addition to those described.

The host module(s) 172 may facilitate interaction between the EBPP computer 120 and any number of users. For example, a user may utilize a user device 130 to access a host module 172 and request EBPP services. As another example, a component of the budget system 105 may access a host module 172 to request EBPP information. The host module(s) 172 may include any number of suitable host modules, such as Web servers, email servers, and/or short message service ("SMS") processing applications, including various dedicated applications, that facilitate interaction with any number of user devices 130.

With continued reference to the EBPP computer 120, the one or more I/O interfaces 163 may facilitate communication between the EBPP computer 120 and one or more input/output devices, for example, one or more user interface devices, such as a display, keypad, mouse, pointing device, control panel, touch screen display, remote control, microphone, speaker, etc., that facilitate user interaction with the EBPP computer 120. The one or more network interfaces 164 may facilitate connection of the EBPP computer 120 to one or more suitable networks, for example, the networks 135 illustrated in FIG. 1. In this regard, the EBPP computer 120 may receive and/or communicate information to other components of the system 100, such as the budget system 105, the financial institution system 125, and/or the user devices 130.

With continued reference to FIG. 1, any number of financial institution systems 125 may be provided. Each financial institution system 125 may be associated with or maintained by a financial institution, such as a bank. Alternatively, a financial institution system 125 may be associated with a service provider that provides services, such as online banking services, on behalf of one or more financial institutions. Each financial institution system 125 may include any number of financial institution computers, which may include similar components to those described above for the budget computer 115 and/or the EBPP computer 120. In certain embodiments, a financial institution system 125 may host one or more financial services, such as online banking services, that are accessed by users utilizing one or more user devices 130 and/or that are accessed by other components of the system 100, such as the budget system 105.

With continued reference to FIG. 1, any number of user devices 130 may be provided. A user device 130 may be a suitable processor-driven device, such as a personal computer or a mobile device, that facilitates access of one or more services via the networks 135. A such, a user device 130 may include any number of processors, memory devices, I/O interfaces, and/or network interfaces. The processors may access computer-executable instructions and/or programming modules (e.g., a Web browser) that facilitate operations of the user device in accordance with various embodiments of the invention. In certain embodiments, a user may utilize a user device 130 to access one or more Web sites hosted by other components of the system 100, such as the budget system 105, the EBPP system 110, and/or the financial institution system 125. For example, the user may access one or more Web sites associated with budgeting services, EBPP services, and/or online banking services. Additionally, the user may provide user commands, requests, and/or information to one or more hosted services via the user device 130. The user may also receive any number of presentations, messages, and/or alerts via the user device 130.

The networks 135 may include any telecommunication and/or data networks, whether public, private, or a combination thereof, including but not limited to, a local area network, a wide area network, an intranet, the Internet, intermediate handheld data transfer devices, public switched telephone networks, and/or any combination thereof and may be wired and/or wireless.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. Accordingly, embodiments of the invention should not be construed as being limited to any particular operating environment, system architecture, or device configuration.

II. Operational Overview

Figure 2:
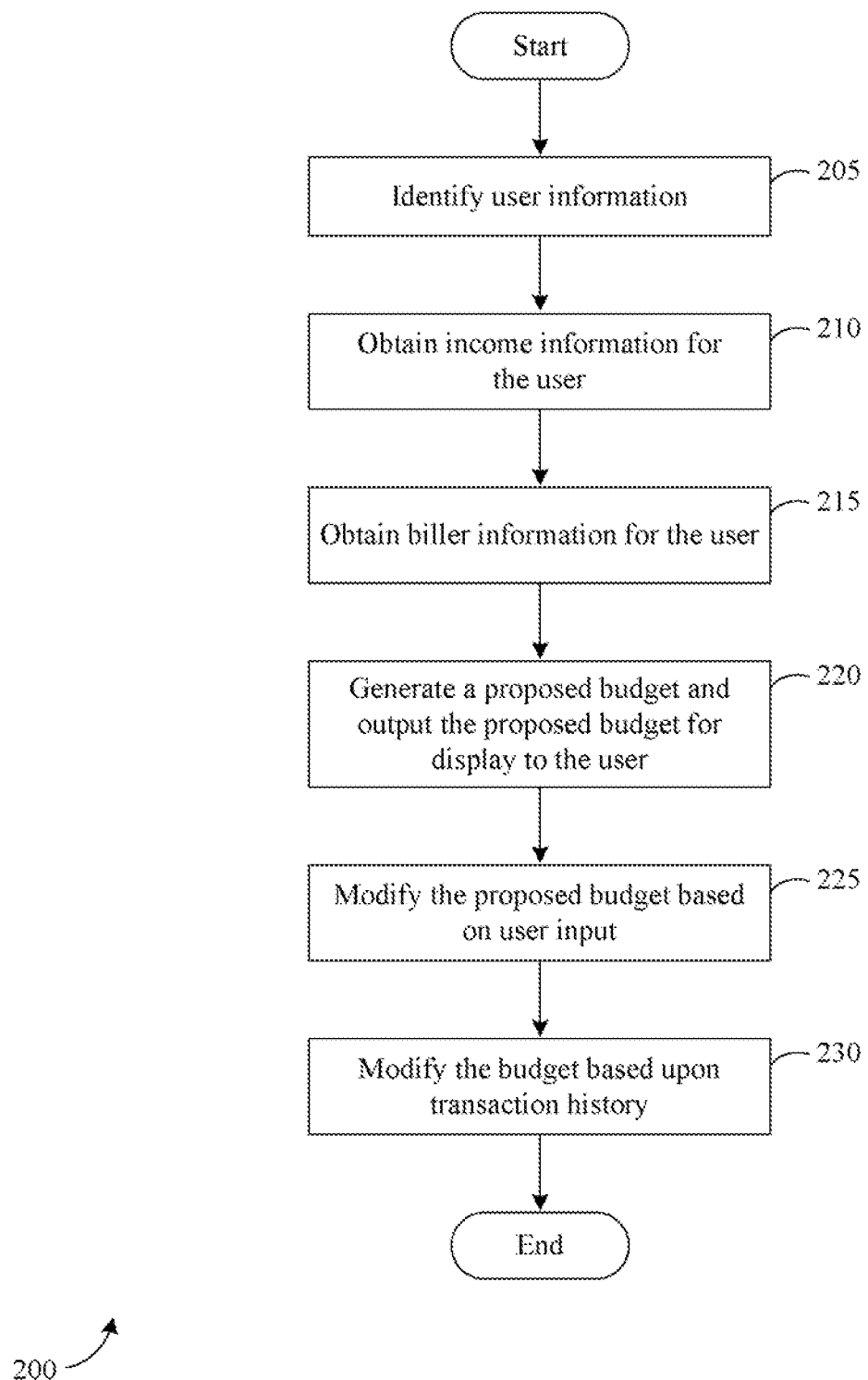
FIG. 2 is a flow diagram of an example method for preparing a budget, according to an example embodiment of the invention.

FIG. 2 is a flow diagram of an example method 200 for preparing a budget, according to an example embodiment of the invention. In certain embodiments, the operations of the method 200 may be performed by one or more budget computers associated with a budget system, such as the one or more budget computers 115 associated with the budget system 105 of FIG. 1. The method 200 may begin at block 205.

At block 205, information associated with a user or customer of the budget system 105 may be identified. A wide variety of different types of user information may be identified and/or collected as desired in various embodiments of the invention, such as a user name, user address information, information associated with one or more financial institutions of the user, information associated with one or more financial accounts of the user, and/or other information. Additionally, a wide variety of suitable techniques may be utilized to identify and/or collect user information. In certain embodiments, user information may be identified when a user requests the generation or building of a budget and/or when the user enrolls with the budget system 105. For example, a user may provide user information to the budget system 105 via one or more graphical user interfaces and/or data collection screens presented to the user during an enrollment process. In other embodiments, user information may be collected by the budget system 105 from an electronic bill payment and presentment ("EBPP") system, such as the EBPP system 110 illustrated in FIG. 1. For example, the budget system 105 may determine that a user is a customer of the EBPP system 110, and the budget system 105 may request information associated with the user from the EBPP system 110.

At block 210, which may be optional in certain embodiments of the invention, income information associated with the user may be obtained or determined. A wide variety of suitable methods and/or techniques may be utilized as desired to obtain income information. For example, income information may be obtained from the user utilizing any number of suitable prompts and/or presentations that facilitate the receipt of user input. As another example, income information may be calculated or determined by analyzing historical deposit information for one or more financial accounts associated with the user. For example, the budget system 105 may access one or more online banking systems and/or financial institution systems, such as the financial institution systems 125 illustrated in FIG. 1, and the budget system may obtain historical deposit information from the accessed systems. An online banking system may be maintained by a financial institution or by another entity on behalf of a financial institution. For purposes of this disclosure, the accessed system will be referred to as a financial institution system 125; however, other types of systems may be accessed as desired. In certain embodiments, the budget system 105 may log onto one or more financial institution systems 125 utilizing access credentials (e.g., user name, password, etc.) obtained from the user. In other embodiments, the budget system 105 may be incorporated into or otherwise associated with a financial institution system 125. For example, a financial institution may offer a budgeting service provided by the budget system 105. A customer may access a financial institution system 125 and be directed to the budget system 105 by the financial institution system 125. In such a scenario, the budget system 105 may be permitted to access financial data associated with the user from the financial institution system 125.

Once historical deposit information has been obtained or determined, the budget system may analyze at least a portion of the historical deposit information in order to identify recurring deposit amounts, such as direct deposit amounts for the user. In this regard, the budget system 105 may identify income amounts for the user that may be incorporated into a budget. As desired, the determined income amounts may be verified and/or modified by the user. One example of the operations that may be utilized to obtain and/or determine income information for the user is described in greater detail below with reference to FIG. 3.

At block 215, payee and/or biller information associated with the user may be obtained or determined. In certain embodiments, payee or biller information may be determined for any number of suitable budget categories (e.g., housing, electricity, automobile, transportation, water, gas, cable, telephone, cellular phone, credit card(s), etc.). A wide variety of suitable methods and/or techniques may be utilized as desired to obtain biller or payee information associated with a user. For example, payee information may be received from the user utilizing any number of suitable data prompts and/or presentations that facilitate the receipt of user input associated with payees of the user. In certain embodiments, a determination may be made as to whether one or more payees identified by the user have been established as payees for the user at an electronic bill payment and presentment ("EBPP") system, such as the EBPP system 110 illustrated in FIG. 1. If it is determined that a payee has not been established as an EBPP payee, then the user may be invited to add the payee as an EBPP payee. One example of the operations that may be utilized to facilitate this invitation process is described in greater detail below with reference to FIG. 6.

As another example, demographic information associated with the user (e.g., location information, income information, etc.) and/or credit report information associated with the user may be utilized to identify or determine probable payees for the user. For example, probable utility service providers may be determined based at least in part upon the user's address. As yet another example, biller or payee information may be obtained from the EBPP system 110. For example, a determination may be made that the user is a customer of the EBPP system 110. Based at least in part upon the determination, identifying information for one or more payees of the user (e.g., payee name, payee category information, etc.) may be obtained and/or accessed from the EBPP system 110. Based at least in part upon the obtained information, one or more payees of the user may be identified for inclusion in a budget for the payee. Additionally, in certain embodiments, historical information associated with bills issued by payees for the user and/or payments made by the EBPP system 110 to the payees on behalf of the user may be obtained from the EBPP system 110. The budget system 105 may analyze and/or evaluate at least a portion of the historical information in order to calculate or determine amounts to be budgeted for various payees of the user. For example, amounts associated with recurring payments may be identified. As another example, expected amounts may be calculated based upon an averaging and/or statistical analysis of historical payment amounts. As desired, identified payees and/or determined budget amounts may be verified and/or modified by the user. One example of the operations that may be utilized to obtain and/or determine payee information for the user is described in greater detail below with reference to FIG. 4.

Additionally, in certain embodiments, information obtained from the EBPP system 110 may be utilized to identify probable payees of the user. For example, if the user is not a customer of the EBPP system 110 and/or if the user has not established a biller at the EBPP system 110 for one or more biller categories, one or more probable payees of the user may be determined. A wide variety of suitable methods and/or techniques may be utilized to determine probable payees based upon information obtained from the EBPP system 110. For example, payees of one or more customers of the EBPP system 110 that are geographically located near the user (e.g., an EBPP customer that lives within the same ZIP code or on the same street as the user, etc.) may be determined, and at least a portion of the identified payees of the EBPP customers may be identified as probable payees of the user. As desired, identified probable payees may be verified and/or modified by the user.

At block 220, a proposed budget may be generated for the user. A wide variety of income information, payee information, budget amounts, and/or proposed payee information may be included in a proposed budget. In certain embodiments, the budget may be organized in accordance with a wide variety of different budget categories. Additionally, a wide variety of suggestions and/or determinations may be made by the budget system 105. For example, a determination may be made as to whether income matches expenses and/or whether desired savings goals are obtainable or feasible based upon income and/or expense information. As desired, any number of presentations and/or graphical user interfaces may be generated in association with the proposed budget. The proposed budget may be transmitted or otherwise output by the budget system 105 for display or other presentation to the user. For example, a Web page display may be generated and communicated to a suitable user device 130 for presentation to the user.

At block 225, which may be optional in certain embodiments of the invention, the proposed budget may be modified based at least in part upon received user input. For example, user input associated with the modification of a list of payees and/or the modification of budget amounts and/or income amounts may be received. Additionally, information associated with any number of user savings goals and/or other budgeted items may be received. Based at least in part upon the received user input, the proposed budget may be modified by the budget system 105. As desired, information associated with the modified budget may be stored or saved in memory, and any number of presentations associated with the budget may be updated. Additionally, in certain embodiments, received user input may trigger various EBPP functionality, such as the addition of budget payees as EBPP payees and/or the establishment of electronic bill presentment.

At block 230, which may be optional in certain embodiments of the invention, a proposed or stored budget for the user may be modified based upon transaction information, such as transaction history information, associated with the user. For example, following the establishment of a budget, additional transaction history information associated with the user (e.g., deposit information, billing information, payment information, etc.) may be accumulated, and at least a portion of the additional information may be obtained from one or more financial institution systems 125 and/or from the EBPP system 110. For example, transaction information may be periodically obtained in accordance with a predetermined time interval (e.g., once a month, once a quarter, once a year, etc.). As another example, transaction information may be obtained based upon the receipt of a user request to update a budget. Based upon an analysis or an evaluation of the obtained transaction information, modifications or revisions to the budget, such as income modifications and/or budget amount modifications, may be made. As desired, any modifications or revisions may be presented to the user and verified and/or adjusted by the user. One example of the operations that may be utilized to modify a budget based upon transaction information is described in greater detail below with reference to FIG. 10.

The method 200 may end following block 230.

Figure 3:
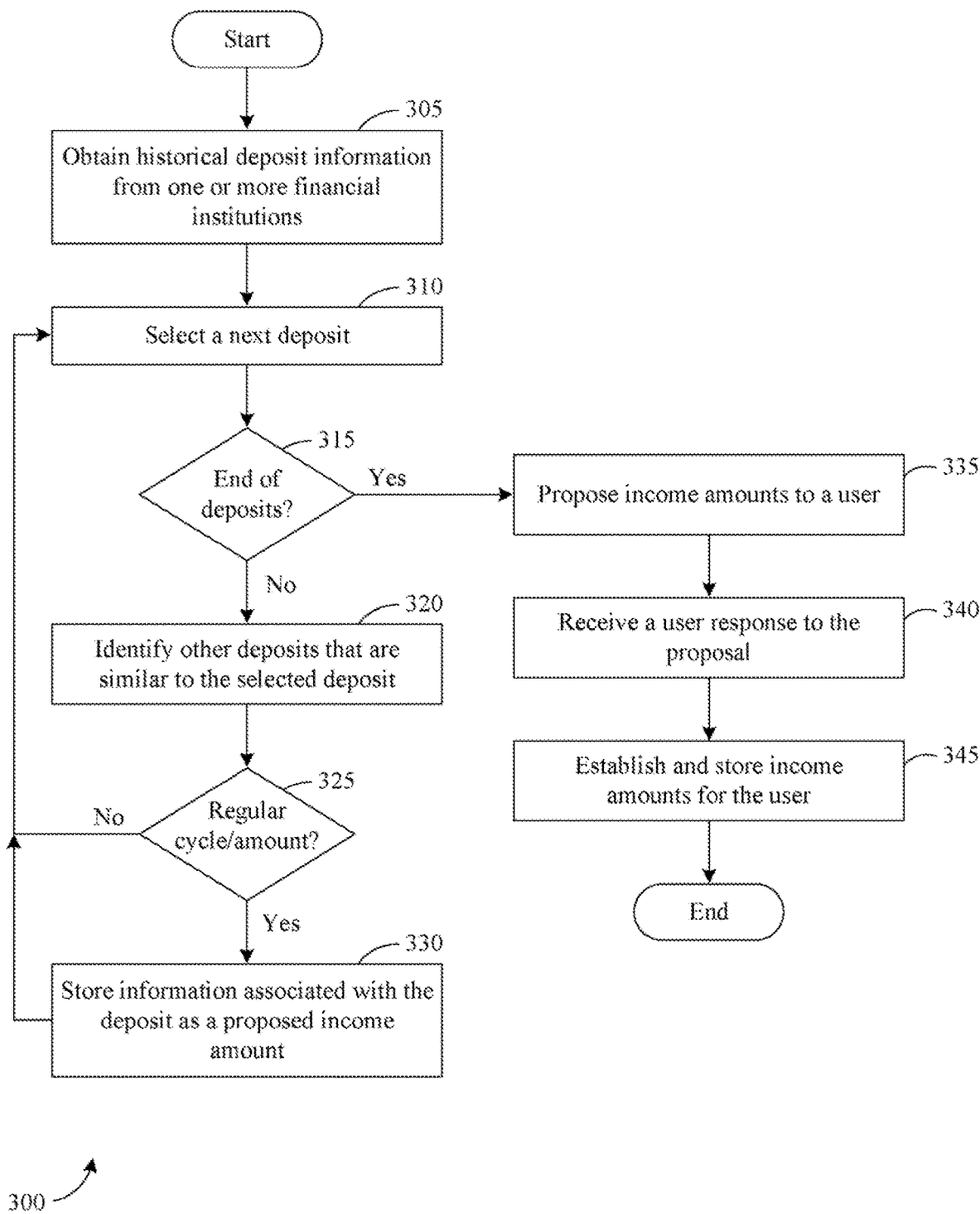
FIG. 3 is a flow diagram of an example method for identifying income amounts associated with a budget, according to an example embodiment of the invention.

FIG. 3 is a flow diagram of an example method 300 for identifying income amounts associated with a budget, according to an example embodiment of the invention. The operations included in the method 300 may be one example of the operations performed at block 210 of the method 200 illustrated in FIG. 2. As such, the operations of the method 300 may be performed by one or more budget computers associated with a budget system, such as the one or more budget computers 115 associated with the budget system 105 of FIG. 1. The method 300 may begin at block 305.

At block 305, historical deposit information for a user may be obtained from any number of financial institution systems, such as the financial institution systems 125 illustrated in FIG. 1. A wide variety of suitable techniques may be utilized as desired to obtain historical deposit information from a financial institution system 125. For example, in certain embodiments, the budget service provided by the budget system 105 may be offered by a financial institution to financial institution customers. In these embodiments, the budget system 105 may be part of a financial institution system 125 or, alternatively, the budget system 105 may be provided by a service provider of the financial institution. A customer of the financial institution may access online banking services provided by the financial institution system 125. A customer request to access a budget service may be received by the financial institution system 125, and the financial institution system 125 may link the customer to the budget system 105. The relationship between the financial institution system 125 and the budget system 105 may allow the budget system 105 to access and/or request historical deposit information for the customer or user from the financial institution system 125.

As another example, in embodiments in which online banking functionality is separate from budget functionality, user access credentials (e.g., user name, password, etc.) associated with the financial institution system 125 may be obtained from the user. The budget system 105 may utilize the access credentials to log onto an online banking service provided by the financial institution system 125, and the budget system 105 may navigate to historical deposit information provided by the online banking service. The budget system 105 may then download or otherwise obtain the historical deposit information.

The obtained historical deposit information may include information associated with any number of cleared items for the user, such as cleared debit and/or credit transactions for the user. Additionally, historical deposit information may be obtained for a wide variety of different time periods, such as the previous ninety (90) days or the previous one hundred and eighty (180) days. In certain embodiments, cleared item information associated with credits or deposits to one or more user financial accounts may be identified for processing. As desired, a wide variety of various information may be provided for a deposit cleared item, such as a textual description of the deposit, a payer associated with the deposit, a deposit amount, a deposit date, etc. In certain embodiments, direct deposits may be identified by one or more text strings included in the description of the deposits. For example, descriptors such as "DIRECT DEP," "NET-PAY," and/or other suitable descriptors may be identified as being associated with direct deposits.

At block 310, a next deposit included in the historical deposit information may be selected. Additionally, if a next deposit is available for selection, information associated with the deposit, such as a deposit amount and/or a payer, may be identified. At block 315, a determination may be made as to whether the end of the deposits included in the historical deposit information has been reached. In other words, a determination may be made as to whether all of the deposits included in the historical deposit information have been processed and/or analyzed. If it is determined at block 315 that the end of the deposits has been reached, then operations may continue at block 335 described in greater detail below. If, however, it is determined at block 315 that the end of the deposits has not been reached, then operations may continue at block 320.

At block 320, one or more deposits that are similar to or related to the selected deposit may be identified. For example, one or more other deposits including similar deposit information, such as the same payer, may be identified. In this regard, a family or group of related deposits included in the historical deposit information may be identified. As desired, deposits included in the family may be marked as having been processed in order to avoid duplicative processing of deposits included in the historical deposit information. At block 325, a determination may be made as to whether the identified family of similar deposits follows a pattern. In certain embodiments, a determination may be made as to whether there is a correlation between the amounts associated with the deposits. For example, a determination may be made as to whether the amounts for the deposits are the same. As another example, a determination may be made as to whether the amounts are similar within a predetermined tolerance level (e.g., within ten percent, etc.). Additionally, a determination may be made as to whether one or more time intervals between the dates associated with the deposits are the same or similar within a predetermined tolerance level, such as a tolerance level that makes allowances for weekends, holidays, and/or months having differing numbers of days. For example, a determination may be made as to whether the deposits were made weekly, bi-weekly, monthly, and/or in accordance with another acceptable time period. Based at least in part upon identifying a correlation between the amounts and/or deposit dates associated with the deposits, a determination may be made as to whether a pattern exists. If it is determined at block 325 that the deposits do not follow a pattern, then operations may continue at block 310, and a next deposit may be selected for analysis. If, however, it is determined at block 325 that the deposits follow a pattern, then operations may continue at block 330.

At block 330, information associated with the selected deposit and/or the similar deposits may be stored as a proposed income amount for the user. For example, an identifier of the payee and/or a proposed income amount may be stored. As desired, the proposed income amount may be determined or calculated utilizing the various income amounts associated with the family of deposits. For example, an average income amount per pay period may be calculated. A proposed income amount for a budgeting cycle may then be determined based at least in part upon the average income amount per pay period. As one example, given a monthly budgeting cycle and weekly direct deposits, an average weekly income amount may be multiplied by four in order to calculate a proposed income amount. As desired, the proposed income amount may be rounded to a desired degree of significance (e.g., up to the nearest multiple of ten dollars ($10), etc.). Operations may then continue at block 310, and a next deposit (or family of deposits) may be selected. In this regard, multiple income streams may be identified.

The operations described at blocks 310-330 describe a method in which payees of deposit transactions are identified based upon suitable descriptors. However, in certain circumstances, sufficient textual descriptors may not be available to identify related deposits. In these situations, a wide variety of suitable matching and/or statistical analysis techniques may be utilized to identify a pattern of deposits. For example, a pattern of deposits may be identified based upon an analysis of deposit dates and amounts. As desired, a suitable template matching technique and/or Monte Carlo statistical analysis may be utilized. A few of the techniques that may be utilized are described in U.S. patent application Ser. Nos. 12/408,521 and 12/408,544, which are incorporated by reference herein in their entirety.

At block 335, an analysis of the historical deposit information and the identification of one or more income streams may be completed. As desired, one or more proposed income amounts may be presented to the user. In this regard, the user may be allowed to review, modify, and/or supplement the proposed income amounts. The proposed income amounts may include individual proposed income amounts associated with different payers (e.g., employers, etc.) and/or a combined proposed income amount. In certain embodiments, a presentation or graphical user interface (e.g., one or more suitable Web pages) including the proposed income amounts may be prepared and transmitted or otherwise output by the budget system 105 for presentation to the user via a suitable user device, such as the user device 130 illustrated in FIG. 1. In other embodiments, proposed income amounts may be presented to a user utilizing short message service ("SMS") messaging, email, and/or other suitable communication techniques.

At block 340, one or more user responses to the proposed income amounts may be received. The user responses may include, for example, approvals for one or more proposed income amounts, removals or deletions for one or more proposed income amounts, modifications to one or more payers and/or proposed income amounts, and/or identifications of one or more additional payers and/or income amounts associated with the additional payers. At block 345, the proposed income amounts and/or user responses may be processed, and one or more income amounts (e.g., individual income amounts and/or a total income amount) may be established for a budgeting cycle. The established income amounts may then be stored in association with the user. In certain embodiments, the total income for a user may be utilized and/or referenced as the user enters information associated with budget expenses. For example, a running difference between the user's income and the user's expenses may be tracked.

The method 300 may end following block 345.

Figure 4:
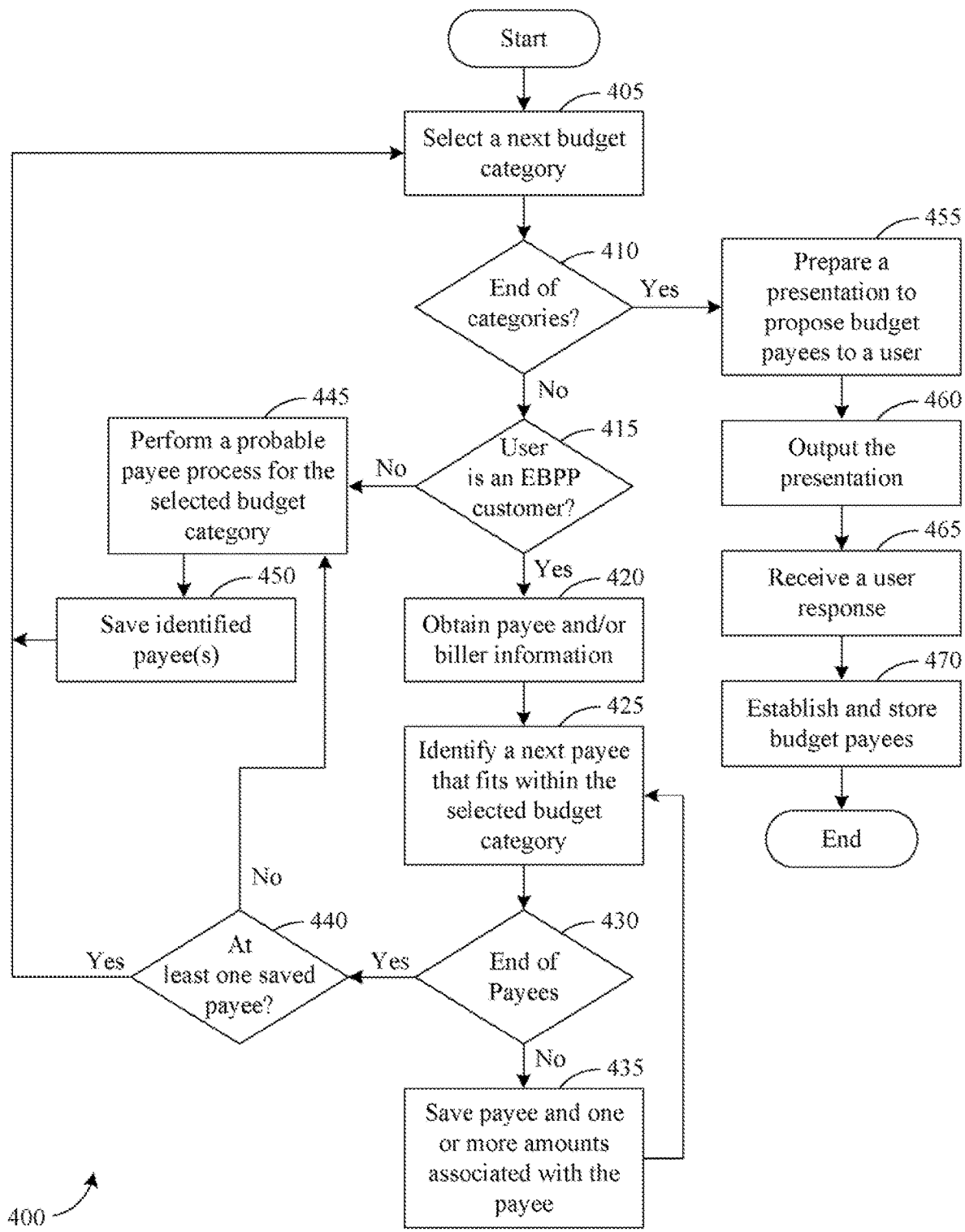
FIG. 4 is a flow diagram of an example method for identifying payees associated with a budget, according to an example embodiment of the invention.

FIG. 4 is a flow diagram of an example method 400 for identifying payees associated with a budget, according to an example embodiment of the invention. The operations included in the method 400 may be one example of the operations performed at block 215 of the method 200 illustrated in FIG. 2. As such, the operations of the method 400 may be performed by one or more budget computers associated with a budget system, such as the one or more budget computers 115 associated with the budget system 105 of FIG. 1. The method 400 may begin at block 405.

At block 405, a next budget category associated with the generation of a budget may be selected. As desired, a budget that is generated for a user may include any number of budget categories, including but not limited to, housing, electricity, automobile, transportation, water, gas, cable, telephone, cellular phone, and/or credit card(s). Any number of payees and/or billers may be identified in association with each category. For example, multiple utility providers and/or multiple credit cards may be identified for respective utility and/or credit card budget categories. Additionally, in certain embodiments, a user may be permitted to customize the budget categories (e.g., remove categories, add categories, rename categories, etc.).

Once a next budget category has been selected at block 405, operations may continue at block 410. At block 410; a determination may be made as to whether the end of the budget categories associated with building or generating a budget has been reached. If it is determined at block 410 that the end of the budget categories has been reached, then operations may continue at block 455 described in greater detail below. If, however, it is determined at block 410 that the end of the budget categories has not been reached, then operations may continue at block 415.

At block 415, a determination may be made as to whether the user is a customer of an EBPP service. In other words, a determination may be made as to whether the user has activated electronic bill presentment and/or electronic payment services offered by any number of suitable EBPP systems, such as the EBPP system 110 illustrated in FIG. 1. A wide variety of suitable techniques may be utilized as desired in order to determine whether the user is an EBPP customer. For example, identifying information associated with the user (e.g., a user name, user address, etc.) may be communicated by the budget system 105 to the EBPP system 110 (or a financial institution for the user) along with a request to determine whether the user has been enrolled for electronic payment and/or bill presentment services. The EBPP system 110 may compare at least a portion of the user information to stored information associated with EBPP customers, and the EBPP system 110 may determine whether the user is an EBPP customer. The EBPP system 110 may then return a response to the budget system 105 including an indication of whether the user is an EBPP customer. Based upon the received response to the request, the budget system 105 may determine whether the user is an EBPP customer. As another example, a budget system 105 and an EBPP system 110 may be integrated, and the budget system 105 may access a data repository of EBPP customers. Based at least in part on a comparison of the accessed information to information associated with the user, the budget system 105 may determine whether the user is an EBPP customer. If it is determined at block 415 that the user is not an EBPP customer, then operations may continue at block 445 described in greater detail below, and a probable payee process may be performed. If, however, it is determined at block 415 that the user is an EBPP customer, then operations may continue at block 420.

At block 420, payee and/or biller information for the user may be obtained from the EBPP system 110. In certain embodiments, the budget system 105 may communicate one or more requests for payee information to the EBPP system 110, and the EBPP system 110 may return payee information in response to the one or more requests. A wide variety of different types of payee information may be obtained from the EBPP system 110 as desired in various embodiments of the invention, such as, a list of payees and/or billers for the user, billing information and/or bill summary information for the user, payment history information, and/or recurring payment information. In certain embodiments, payee information may be obtained in a single data pull and/or as a result of a single data request. In other embodiments, multiple data requests may be utilized. For example, a list of payees may be obtained in response to a first request. Billing and/or payment information associated with selected payees may then be obtained in response to one or more additional requests. Additionally, as desired, information for payees that fall within a plurality of different budget categories may be simultaneously obtained by the budget system 105.

At block 425, a next payee that fits within the selected budget category and/or that matches the selected budget category may be identified or selected. In certain embodiments, a payee list for the user may be analyzed, and a next payee may be identified based at least in part upon categorization information included in the payee list (e.g., bill payment categorization information) and/or identifying information for the payee (e.g., payee name information). In other embodiments, billing and/or payment history information (e.g., categorization information, payee name information, etc.) may be analyzed in a similar manner to facilitate the identification of a next payee that fits within the selected budget category. Once a next payee for a budget category has been identified (if available), operations may continue at block 430.

At block 430, a determination may be made as to whether the end of the payees that fit within the selected budget category has been reached. if it is determined at block 430 that the end of the payees has been reached, then operations may continue at block 440 described in greater detail below. If, however, it is determined at block 430 that the end of the payees that fit within the selected budget category has not been reached, then operations may continue at block 435. At block 435, a determination may be made that the identified or selected payee is a candidate payee for the user. Information associated with the payee may be stored or saved for presentation to the user and/or for inclusion in a proposed budget. As desired, a wide variety of different information may be stored for the payee, such as identification information (e.g., a payee name, a payee address, etc.) and/or one or more proposed budget amounts for the payee. Additionally, a wide variety of suitable techniques may be utilized to identify a proposed budget amount for the payee. For example, billing information and/or transaction history information for the payee may be obtained from the EBPP system 110, and an amount may be determined or calculated based at least in part on an analysis of the obtained information. A determined amount may be, for example, a last billed amount for the payee, a last amount paid to the payee, or an average of billed and/or paid amounts for some period of time. Other considerations, such as the time of year, may also be taken into consideration when proposing a budget amount. For example, a budget amount for an electric bill may be determined based upon the season and/or historical information associated with payments made for a particular month in one or more prior years. Additionally, as desired, an identified payment amount may be rounded to a desired level of significance (e.g., rounded up to the nearest ten dollars ($10)) for budgeting purposes. Once information for the identified payee has been saved, operations may continue at block 425, and a next payee that fits within the selected budget category may be identified for processing. In this regard, multiple payees within the same category may be identified and processed.

Once the payees for the user have been analyzed in association with the selected budget category, a determination may be made at block 440 as to whether at least one payee has been identified as falling within the selected budget category. In other words, a determination may be made as to whether information has been saved for at least one payee in association with the selected budget category. If it is determined at block 440 that information for at least one payee has been saved, then operations may continue at block 405, and a next budget category may be selected for processing. If, however, it is determined at block 440 that information for at least one payee has not been saved, then operations may continue at block 445, and a probable payee process may be performed.

At block 445, a probable payee process may be performed in order to identify one or more probable payees for the user in association with the selected budget category. In other words, if definitive payees of the user cannot be identified, it may be possible to identify probable or likely payees for the user. A wide variety of suitable techniques may be utilized as desired to identify one or more probable payees for the user. For example, demographic information associated with the user (e.g., address, geographic location, banking products and/or services, financial account balances, etc.) may be utilized to predict or identify one or more probable payees. As one example, likely utility providers for the user may be identified based upon the user's address or location. As another example, likely credit providers for the user (e.g., merchant credit providers, etc.) may be identified based upon financial information associated with the user (e.g., financial account balances, median income associated with a ZIP code for the user, etc.). As another example of identifying probable payees of the user, a user's credit report may be obtained and probable payees (e.g., a mortgage company, an automobile loan provider, etc.) may be identified based at least in part on an analysis of credit report information. As yet another example of identifying probable payees, the budget system 105 may obtain payee information from the EBPP system 110 for one or more customers of the EBPP system 110 that are located near the user. For example, a determination may be made that a neighbor of the user is a customer of the EBPP system 110. A payee list for the neighbor may be obtained, and probable payees for the user (e.g., utility providers, etc.) may be identified based upon an analysis of the obtained payee list. The techniques set forth above for identifying probable payees are provided by way of example only. Indeed, a wide variety of suitable methods and/or techniques may be utilized to identify probable payees.

At block 450, information associated with one or more identified probable payees may be stored in association with the user and/or the selected budget category. Operations may then continue at block 405, and a next budget category may be selected for processing.

Once the end of the budget categories has been reached, operations may continue at block 455, and the budget system 105 may prepare one or more presentations associated with the budget categories, identified payees, and/or budget amounts. In the event that multiple payees are identified for a given budget category, respective proposed budget amounts and/or a total proposed budget amount may be included in a presentation. One example of a suitable presentation that may be prepared or generated is described in greater detail below with reference to FIG. 5. At block 460, the one or more presentations may be transmitted or otherwise output for display or other presentation to the user. In this regard, the user may be allowed to review, modify, and/or supplement the payee information and/or budget amounts. In certain embodiments, a presentation or graphical user interface (e.g., one or more suitable Web pages) including the budget categories, proposed payees, and/or proposed budget amounts may be prepared and transmitted or otherwise output by the budget system 105 for presentation to the user via a suitable user device, such as the user device 130 illustrated in FIG. 1. In other embodiments, proposed payee information may be presented to a user utilizing short message service ("SMS") messaging, email, and/or other suitable communication techniques.

At block 465, one or more user responses to the proposed payee information may be received. The user responses may include, for example, approvals for one or more budget categories, proposed payees and/or budget amounts; removals or deletions for one or more budget categories, proposed payees and/or budget amounts; modifications to one or more budget amounts; and/or identifications of one or more additional budget categories, payees and/or budget amounts. In other words, a user may be permitted to override and/or supplement any of the proposals. However, as a result of the automated analysis, the user may be assisted in setting up or establishing a budget. At block 470, budget categories, payees, and/or budget amounts may be established for a budgeting cycle. The established information may then be stored in association with the user. In certain embodiments, if a user approves or accepts an EBPP payee as a budget payee, then a link (e.g., a bi-directional link) between the budget system 105 and the EBPP system 110 may be established for the payee. In this regard, future integration between the budget system 105 and the EBPP system 110 may be facilitated for the payee. For example, budget information may be presented by the EBPP system 110. As another example, budget amounts may be revised by the budget system 105 based at least in part on future billing and/or payment transactions.

The method 400 may end following block 470.

FIG. 5 is an example graphical user interface 500 or presentation that may be utilized to collect payee information associated with a budget, according to an illustrative embodiment of the invention. The presentation 500 may facilitate the selection of payees or billers and/or the entry of budget amounts by a user. As desired, the presentation 500 may be pre-populated with information associated with proposed payees, probable payees, and/or proposed budget amounts for the user.

With reference to FIG. 5, the presentation 500 may include information 505 associated with any number of budget categories, information 510 associated with payees and/or billers, and/or information 515 associated with budget amounts. One or more payees may be listed for each budget category. For example, a plurality of payees may be listed in a drop down list or drop down menu for each budget category. In the event that only a single payee is identified for a budget category, it may not be necessary to provide a drop down menu. Additionally, as desired, multiple instances of a budget category may be presented with different payees (e.g., a first credit card category and a second credit card category). If available, budget amounts may be provided for one or more payees. A wide variety of suitable methods may be utilized to organize multiple payees included in a drop down list. For example, actual payees of the user (e.g., registered EBPP payees) may be ordered in accordance with their respective budget amounts. As another example, probable payees may be ordered in accordance with their respective probabilities of being payees of the user. Once presented, a user can select one or more payees from the drop down list as user payees. As desired, the user can enter the name of a payee that is not included in a drop down list. Additionally, the user can approve, modify, and/or enter budget amounts for each of the payees.

Once information has been approved, modified, and/or entered by the user, the user may direct a user device (e.g., a computer, a mobile device, etc.) to communicate the user preferences and/or information for budget billers to the budget system 105. For example, the user may select a next button 520 to facilitate the communication of budget biller information to the budget system 105. As desired, selection of the next budget 520 may result in the display of additional information and/or presentations to the user.

The presentation 500 illustrated in FIG. 5 is provided by way of example only. A wide variety of different types of presentations and/or graphical user interfaces may be utilized as desired in various embodiments of the invention to collect payee information. For example, a presentation may additionally permit a user to edit budget categories.

According to an aspect of the invention, a budget system, such as the budget system 105 illustrated in FIG. 1, may present any number of invitations to a user to facilitate the activation of electronic bill presentment and/or bill payment at an EBPP system associated with the budget system 105, such as the EBPP system 110 illustrated in FIG. 1. For example, once a budget has been established for a user, the budget system 105 may invite the user to become a customer of the EBPP system 110. As another example, the budget system 105 may communicate an invitation to the user to activate services of the EBPP system 110 for any number of payees of the user.

Figure 6:
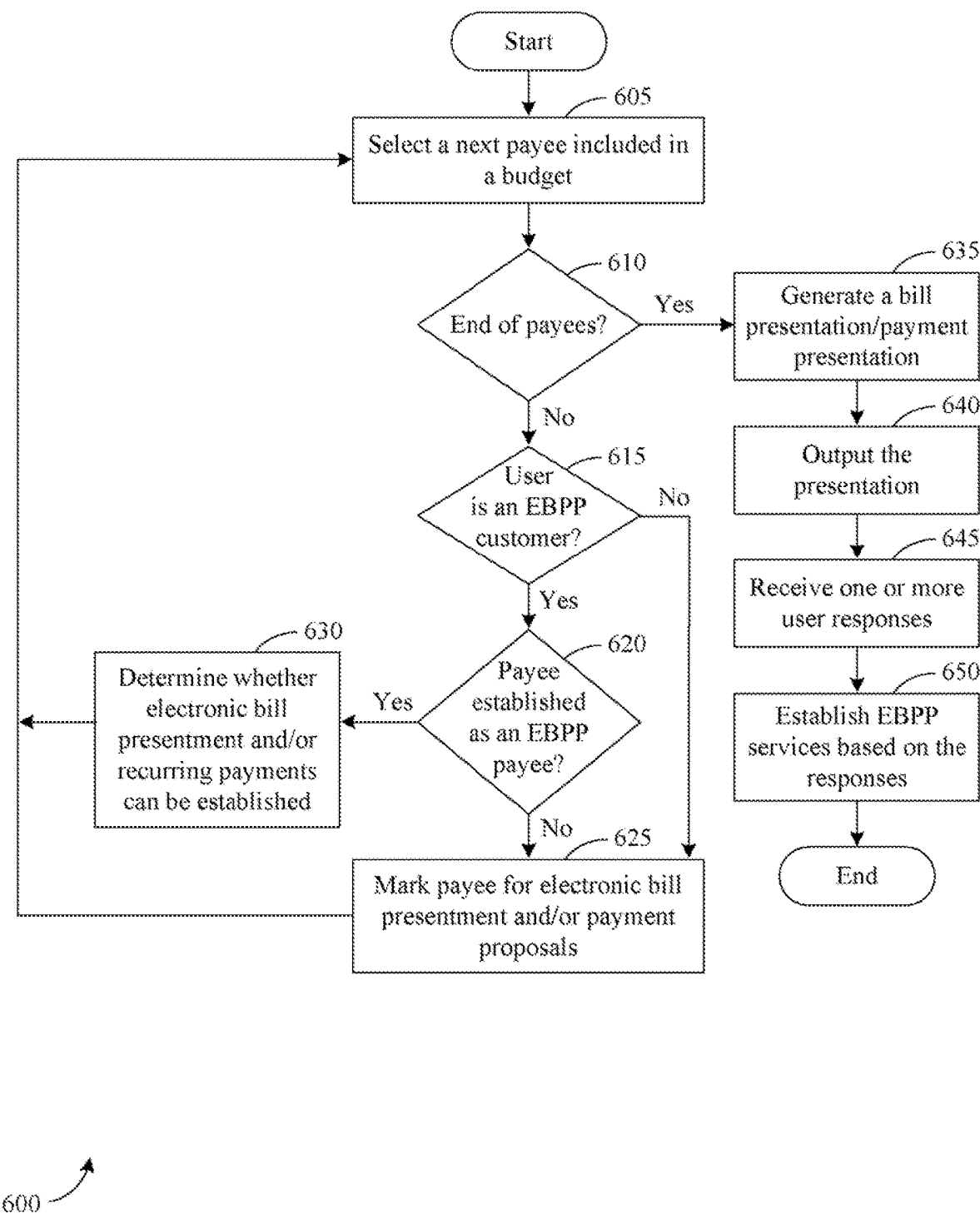
FIG. 6 is a flow diagram of an example method for activating electronic bill presentment and/or payment services in association with one or more payees included in a budget, according to an example embodiment of the invention.

FIG. 6 is a flow diagram of an example method 600 for activating electronic bill presentment and/or payment services in association with one or more payees included in a budget, according to an example embodiment of the invention. In certain embodiments, the operations of the method 600 may be performed by one or more budget computers associated with a budget system, such as the one or more budget computers 115 associated with the budget system 105 of FIG. 1. The method 600 may begin at block 605.

At block 605, a budget for a user may be identified, and a next payee included in the budget may be selected for processing. At block 610, a determination may be made as to whether an end of the payees included in the budget has been reached. If it is determined at block 610 that the end of the payees has been reached, then operations may continue at block 635 described in greater detail below. However, if it is determined at block 610 that the end of the payees has not been reached, then operations may continue at block 615.

At block 615, a determination may be made as to whether the user is a customer of an EBPP system, such as the EBPP system 110 illustrated in FIG. 1. For example, information associated with the user (e.g., a user name) may be communicated to the EBPP system 110 along with a request to determine whether the user is a customer of the EBPP system 110. A determination of whether the user is an EBPP customer may then be made by the budget system 105 based at least in part on a response to the request. As another example, the budget system 105 may access a data repository of EBPP customers and compare information included in the accessed data repository to information associated with the user to determine whether the user is an EBPP customer. As yet another example, online banking services information associated with the user may be analyzed in order to determine whether the user is an EBPP customer. If it is determined at block 615 that the user is not an EBPP customer, then operations may continue at block 625 described in greater detail below. If, however, it is determined at block 615 that the user is an EBPP customer, then operations may continue at block 620.

At block 620, a determination may be made as to whether the selected payee has already been established as an EBPP payee of the user and/or whether a link has been generated between the selected payee and a corresponding EBPP payee. For example, a determination may be made as to whether a link (e.g., a bi-directional link) exists between the selected payee and a corresponding EBPP payee of the user, such as a link established during the initialization and/or modification of a budget. As another example, a determination may be made as to whether the selected payee is included in a payee list for the user that is maintained by the EBPP system 110. As desired, name variations and/or other information (e.g., address information, etc.) associated with the selected payee may be utilized in order to examine a payee list. If it is determined at block 620 that the payee has already been established as a payee of the user, then operations may continue at block 630 described in greater detail below. If, however, it is determined at block 620 that the payee has not been established as an EBPP payee of the user, then operations may continue at block 625.

At block 625, the selected payee may be marked or identified as a payee for which electronic bill presentment and/or payment services may be proposed. A wide variety of EBPP services may be proposed for the selected payee. As desired, one or more flags associated with services to be proposed or offered may be stored in association with the marked payee. As one example, an option to establish a bi-directional link between the selected payee and a corresponding EBPP payee may be proposed. As another example, electronic payment services may be proposed in which the EBPP system 110 will submit payments to the payee on behalf of the user. As desired, a service that facilitates the establishment of recurring payments to the payee, such as monthly payments, may also be proposed. For example, recurring payments may be proposed for payment amounts that are consistent between billing periods, such as mortgage payments and/or insurance payments. As another example, a determination may be made as to whether electronic bill presentment is available for the selected payee. In the event that electronic bill presentment is available for the selected payee, electronic bill presentment (e.g., the electronic delivery of bills) may be proposed for the selected payee. Once one or more proposals have been determined for the selected payee, information associated with the proposals may be stored for subsequent presentation to the payee. Operations may then continue at block 605, and a next payee included in the budget may be selected for processing.

At block 630, it may be determined that the selected payee has already been established as an EBPP payee for the user. In other words, it may be determined that the user has already activated one or more EBPP services for the selected payee. A determination may then be made as to whether any additional EBPP services are available for the selected payee. For example, if only payment services have been activated for the payee, a determination may be made as to whether bill presentment services and/or whether recurring payment services may be offered. As another example, if bill presentment services have been activated for the payee, a determination may be made as to whether electronic payment services may be offered. In this regard, one or more available services that have not been activated for the selected payee may be identified, and information (e.g., flags and/or other indications) associated with the services to be offered or proposed may be stored. As desired in certain embodiments, one or more user preferences and/or suppression information may be analyzed when determining whether to propose a service for offering. For example, if a user has previously declined a particular service for the payee, then the service may not be offered for a predetermined suppression period, such as three months, six months, or one year. Following the identification at block 630 of any additional EBPP services that may be offered, operations may continue at block 605, and a next payee included in the budget may be selected for processing.

Once each of the payees included in the budget has been processed, operations may continue at block 635. At block 635, one or more presentations and/or graphical user interfaces (e.g., Web pages) may be generated in order to present proposals or invitations to activate EBPP services. In certain embodiments, a single presentation may be generated in order to invite a user to activate EBPP services for a plurality of different billers. One example of a presentation that may be generated is described in greater detail below with reference to FIG. 7. In other embodiments, a plurality of presentations may be tiered. For example, a first presentation may invite the user to enroll with the EBPP system 110, a second presentation may invite the user to activate payment services for one or more payees, and a third presentation may invite the user to activate recurring payment services for one or more payees. In certain embodiments, incremental options associated with activating EBPP payment services for a payee, such as electronic bill presentment and/or recurring payments, may be suggested with subsequent presentations and/or in subsequent sessions between the user and the budget system 105. In this regard, a user may not be inundated with a relatively large amount of information at one time. Additionally, as desired in various embodiments, a presentation may include any number of selectable indicators or links, such as a selectable indicator to activate an EBPP service. Selection of a selectable indicator by the user may redirect or link the user to the EBPP system 110 in order to facilitate activation of the desired EBPP service.

At block 640, one or more generated presentations that include invitations or offers to activate EBPP services may be transmitted or otherwise output by the budget system 105 for display or other presentation to the user. For example, the budget system 105 may communicate information associated with one or more presentations to a suitable user device (e.g., a personal computer, a mobile device, etc.) for presentation to the user. The user may review the presentations and select one or more EBPP services for activation. At block 645, one or more user responses to the invitations and/or offers may be received by the budget system 105. For example, user selections for activating various EBPP services may be received. As desired, a user response may trigger further user interface-based interactions to facilitate the collection of additional information associated with a desired service. For example, additional user interfaces and/or presentations may facilitate the receipt of a user's acceptance to various terms and conditions, the receipt of additional payee information from the user (e.g., account number information for the user with the payee, remittance information, etc.), receipt of a desired period for submitting recurring payments, receipt of a desired recurring payment amount, etc. A wide variety of user preferences associated with the customization of EBPP services may be received in various embodiments.

At block 650, the one or more received user responses may be processed, and the budget system 105 may request the EBPP system 110 to enroll the user as an EBPP customer and/or to activate any number of EBPP services associated with payees of the user. As an alternative to the budget system 105 requesting the EBPP system 110 to activate various services, the user may be redirected to the EBPP system 110 once certain EBPP services are requested. In this regard, the user may interact directly with the EBPP system 110 to activate various services. Additionally, in accordance with an aspect of the invention, the activation or establishment of one or more EBPP services for a payee may result in the generation of a link between the budget system 105 and the EBPP system 110 with respect to the payee. For example, a bi-directional link (e.g., one or more pointers and/or location identifiers) may be established for the payee that facilitates further integration between the budget system 105 and the EBPP system 110. In this regard, budget information may be obtained by EBPP system 110 and displayed to the user in association with EBPP services. Similarly, billing and payment information may be obtained by the budget system 105 and utilized in association with budgeting services.

The method 600 may end following block 650.

Figure 7:
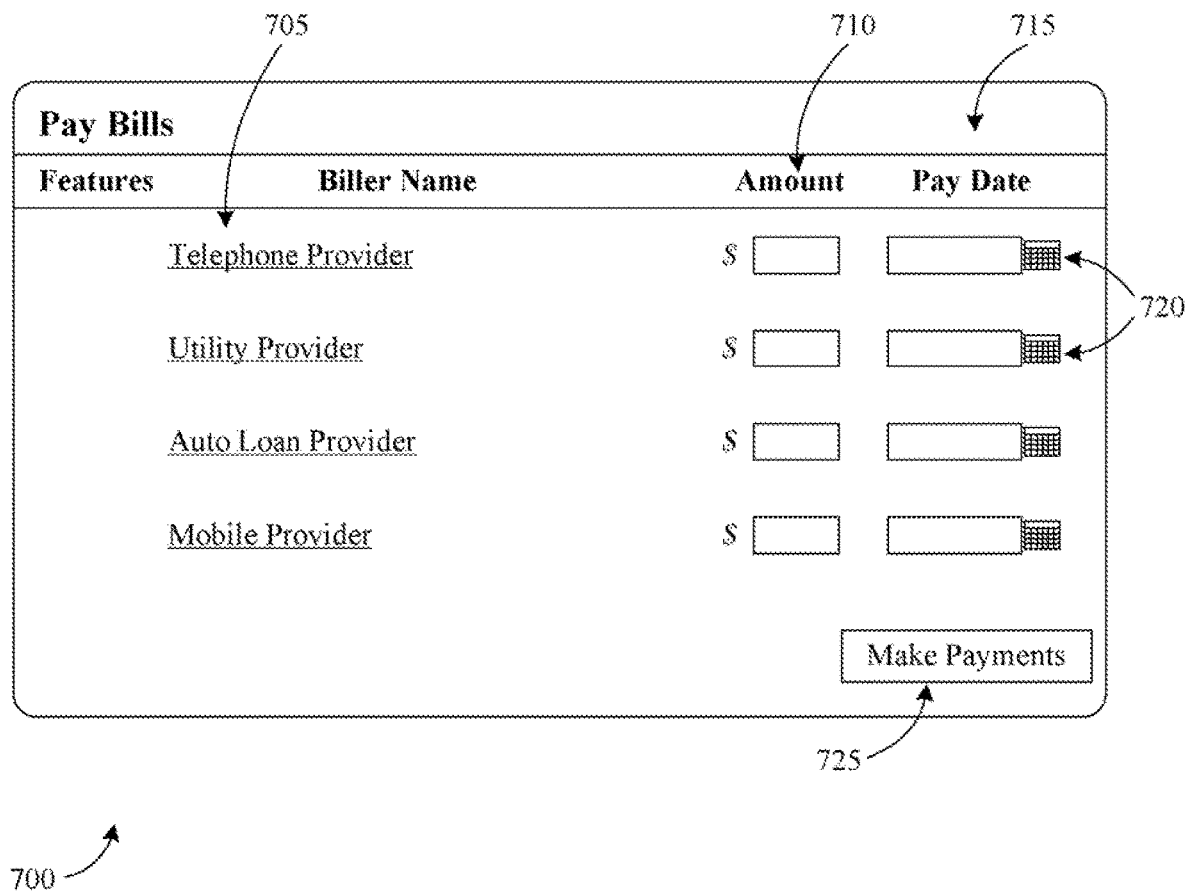
FIG. 7 is an example graphical user interface that may be utilized to facilitate the activation of electronic bill presentment and/or payment services, according to an illustrative embodiment of the invention.

FIG. 7 is an example graphical user interface 700 or presentation that may be utilized to facilitate the activation of electronic bill presentment and/or payment services, according to an illustrative embodiment of the invention. The presentation of FIG. 7 may be utilized to propose various EBPP services to a user of a budget system, such as the budget system 105 illustrated in FIG. 1.

With reference to FIG. 7, the presentation 700 may include identifying information 705 associated with one or more payees that may be added as EBPP payees, one or more fields 710 that permit the user to enter respective payment amounts for the payees, and/or one or more fields 715 that permit the user to select respective payment dates for the payees. A user may select payees for which the user desires to initiate one or more EBPP services that are carried out by the EBPP system 110. In other words, information associated with desired EBPP services may be provided to the budget system 105, and integration and/or communication between the budget system 105 and the EBPP system 110 may facilitate the completion of the requested EBPP services. For example, the user may request the submission of a one time payment by entering a payment amount and payment date for submitting a payment. As an alternative to entering a payment date, the user may select a payment date from a calendar that may be presented to the user (e.g., presented in a pop-up window) based upon the selection of a suitable calendar icon 720. As another example, the user may request the activation of recurring payment services, electronic bill presentment services, and/or other EBPP services. Once the user has entered information associated with the establishment of one or more EBPP services, the user may select a suitable indicator 725 (e.g., a next indicator, a make payments indicator, etc.) that facilitates communication of the user requests to the budget system 105 and/or to the EBPP system 110. As desired, any number of further presentations or graphical user interfaces may be utilized to obtain additional information (e.g., account information, remittance information, etc.) and/or approvals (e.g., an approval of terms and conditions) from the user.

As an alternative to presenting information associated with multiple payees in a single presentation, payees may be processed on a case-by-case basis in order to present invitations and/or offers to activate one or more EBPP services. Additionally, further options may be presented in association with the activation of an EBPP payment service, such as invitations to activate electronic bill presentment and/or invitations to activate recurring payments.

The presentation 700 illustrated in FIG. 7 is provided by way of example only. A wide variety of different types of presentations and/or graphical user interfaces may be utilized as desired in various embodiments of the invention to propose various EBPP services to a user and/or to receive user requests to activate EBPP services.

In certain embodiments of the invention, a budget service provided by a budget system and/or EBPP services provided by an EBPP system may be integrated and/or linked. In other words, data associated with the two types of services may be shared and/or accessed in order to enhance the customer experience of the user. For example, a budget system may obtain information associated with EBPP services and transmit or otherwise output at least a portion of the obtained information for presentation to a user in association with budget services. Similarly, an EBPP system may obtain information associated with budget services and transmit or otherwise output at least a portion of the budget information in association with EBPP services.

Figure 8:
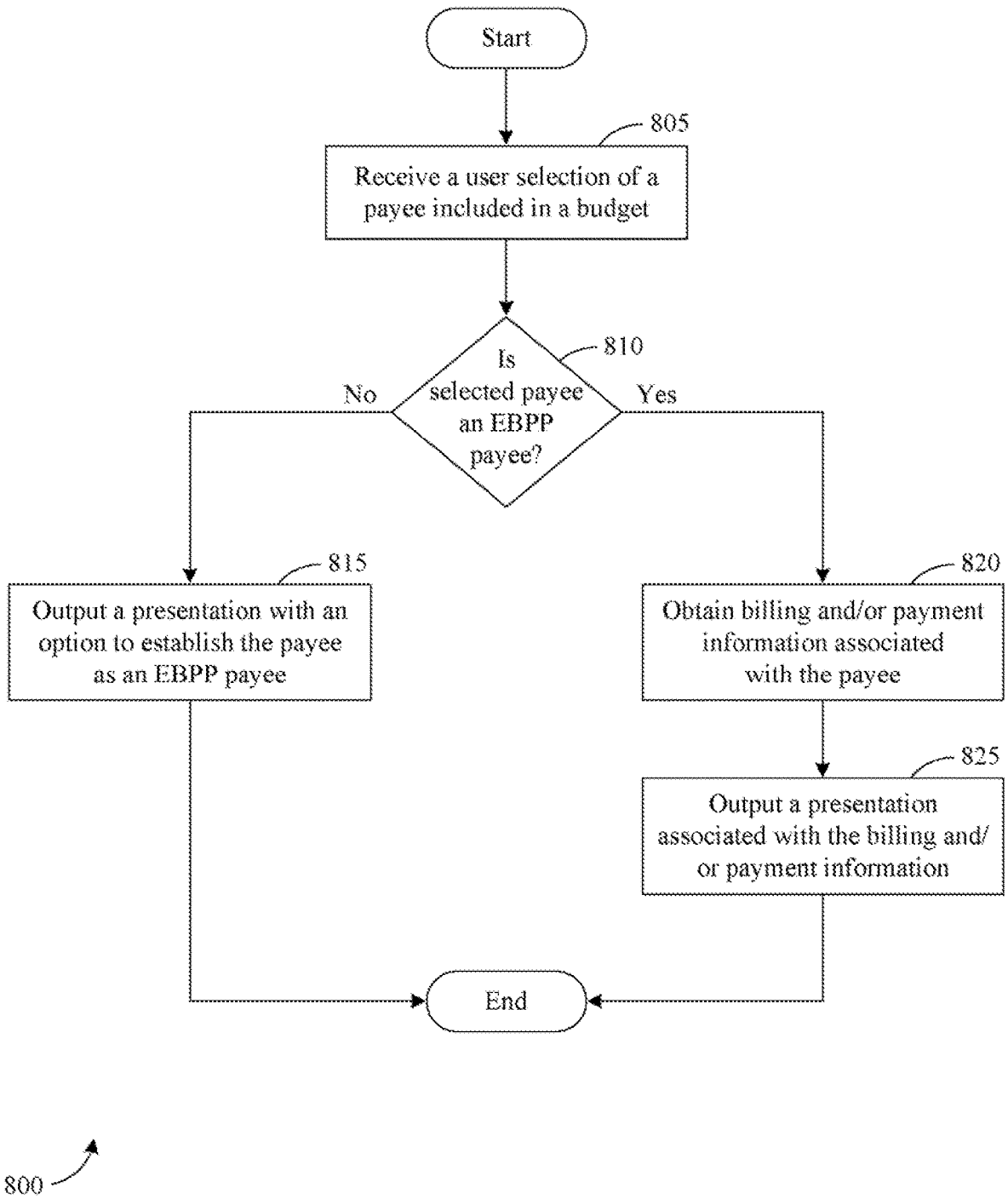
FIG. 8 is a flow diagram of an example method for displaying electronic billing information in association with a payee included in a budget, according to an example embodiment of the invention.

FIG. 8 is a flow diagram of an example method 800 for displaying electronic billing and/or payment information in association with a payee included in a budget, according to an example embodiment of the invention. In certain embodiments, the operations of the method 800 may be performed by one or more budget computers associated with a budget system, such as the one or more budget computers 115 associated with the budget system 105 of FIG. 1. The method 800 may begin at block 805.

At block 805, a user selection of a payee or biller included in a user budget may be received. For example, the budget system 105 may transmit or otherwise output a presentation or graphical user interface associated with a user budget for display to the user via a suitable user device, such as the user device 130 illustrated in FIG. 1. The user may select one or more indicators included in the presentation, such as an indicator (e.g., a hyperlink) associated with a particular payee of the user, and the budget system 105 may receive information associated with the user selection.

At block 810, a determination may be made as to whether the selected payee is an EBPP payee of the user. In other words, a determination may be made as to whether the user has activated one or more EBPP services for the payee at a EBPP system, such as the EBPP system 110 illustrated in FIG. 1, and whether a link between the budget payee and the EBPP payee has been established. A wide variety of suitable techniques may be utilized as desired in order to determine whether the payee is an EBPP payee. For example, the budget system 105 may access stored information associated with the user in order to determine whether there is a link between the selected payee and an associated EBPP payee. As another example, the budget system 105 may communicate a request to the EBPP system 110 to determine whether EBPP services have been activated for the payee, and a determination may be made based at least in part upon a received response to the request. As yet another example, the budget system 105 may access or otherwise obtain an EBPP payee list associated with the user, and a determination may be made based at least in part upon an analysis of the EBPP payee list. If it is determined at block 810 that the selected payee is not an EBPP payee of the user, then operations may continue at block 815.

At block 815, which may be optional in certain embodiments of the invention, one or more presentations may be generated and transmitted or otherwise output in order to facilitate the establishment of EBPP services and/or an EBPP link for the payee. For example, a pop-up window may be generated to invite the user to enroll for EBPP services and/or to activate one or more EBPP services for the payee. As another example, in certain embodiments, the payee may be an EBPP payee; however, a link between the budget payee and the EBPP payee may not exist. A pop-up window may be generated to invite the user to establish a link between the budget payee and the existing EBPP payee. The activation of EBPP services and/or the establishment of a link may be performed in a similar manner as that described above with reference to FIG. 6. Operations may then end following block 815.

If, however, it is determined at block 810 that the selected payee is an EBPP payee and that a link exists between the budget payee and the EBPP payee, then operations may continue at block 820. At block 820, the EBPP system 110 may be accessed in order to obtain EBPP information associated with the payee. A wide variety of suitable billing and/or payment information associated with the payee may be obtained as desired in various embodiments of the invention. Examples of information that may be obtained include, but are not limited to, information associated with a last payment made by the EBPP system 110 to the payee (e.g., a payment amount, a payment date, a status of the payment, etc.), information associated with any number of past or historical payments, information associated with whether electronic billing may be activated for the payee, an indicator of whether electronic billing has been activated for the payee, electronic billing information for the payee (e.g., a total amount due, a minimum amount due, a due date, detailed billing information, information associated with whether a payment has been scheduled or requested, etc.), an indicator of whether automatic payment has been activated, an indicator of whether a recurring payment has been established, etc.

At block 825, at least a portion of the obtained or collected EBPP information may be utilized by the budget system 105 to generate one or more presentations for transmission or output to the user. For example, collected information may be summarized and/or formatted for presentment in one or more pop-up windows, such as the pop-up window 900 illustrated in FIG. 9. Once generated, one or more presentations may be transmitted or otherwise output by the budget system 105 for display to the user by the user device 130. A wide variety of different types of information may be included in one or more generated presentations, such as a summary of the latest payment and/or bill, a selectable link that facilitates the access of more detailed information associated with a payment and/or bill, past history information for bills and/or payments, statistical information associated with past bills and/or payments (e.g., average billing amounts, billing trends, etc.), a proposal of a revised budget amount, one or more invitations to activate additional EBPP services for the payee (e.g., electronic bill presentment services, recurring payment services), and/or one or more options that facilitate the performance of various EBPP actions (e.g., establishment of electronic bill presentment, recurring payments, and/or automatic payments), etc.

The method 800 may end following either block 815 or block 825.

Figure 9:
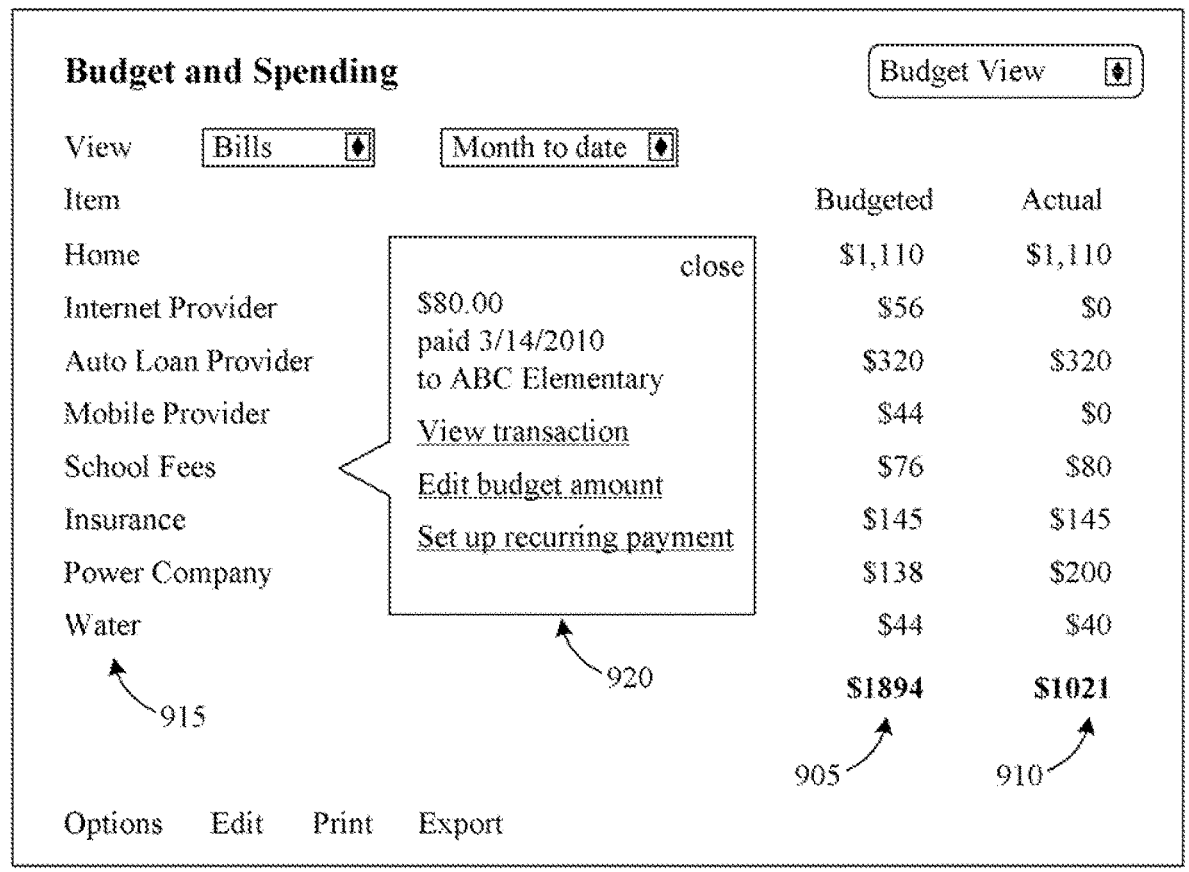
FIG. 9 is an example graphical user interface that may be utilized to display electronic billing information in association with a payee included in a budget, according to an illustrative embodiment of the invention.

FIG. 9 is an example graphical user interface 900 or presentation that may be utilized to display electronic billing information in association with a payee included in a budget, according to an illustrative embodiment of the invention. The presentation 900 is one example of a presentation that may be generated and transmitted or otherwise output at block 825 of the method 800 of FIG. 8. With reference to FIG. 9, the presentation 900 illustrates budgeted amounts 905 and actual payment amounts 910 for one or more budget payees 915.

Additionally, in accordance with an aspect of the invention, selection of a budget payee may result in the presentation of additional information associated with the payee. For example, if a link is established between the budget payee and an associated EBPP payee, EBPP information associated with the payee may be obtained from an EBPP system, such as the EBPP system 110 illustrated in FIG. 1. Based at least in part on a portion of the obtained information, a pop-up window 920 may be generated for presentation to the user. A wide variety of information may be included in the pop-up window 920 as desired in various embodiments, such as information associated with a last payment made to the payee by the EBPP system 110, a selectable indicator or link to additional transaction and/or payment information, a selectable indicator that facilitates the adjustment of a budgeted amount for the payee, and/or one or more links to activate EBPP services for the payee (e.g., a link to establish recurring payments, a link to establish electronic bill presentment, etc.). As another example, if a link is not established between the budget payee and an associated EBPP payee, then a pop-up window with an invitation to activate EBPP services and/or to establish an EBPP link may be generated and transmitted or otherwise output for presentation.

The presentation 900 illustrated in FIG. 9 is provided by way of example only. A wide variety of different types of presentations and/or graphical user interfaces may be utilized as desired in various embodiments of the invention to display EBPP information by a budget system 105.

As desired in various embodiments of the invention, user budgets may be periodically modified. For example, proposed modifications to budgeted payees and/or budgeted amounts may be periodically determined and/or presented to a user. A wide variety of suitable time periods may be utilized to facilitate periodic modifications. For example, modifications may be proposed monthly, quarterly, yearly, or in accordance with any other suitable time period. Additionally, in certain embodiments, a user may be permitted to establish a period for proposing modifications. As desired, a user may also request a budget system to identify and propose modifications to a budget.

Figure 10:
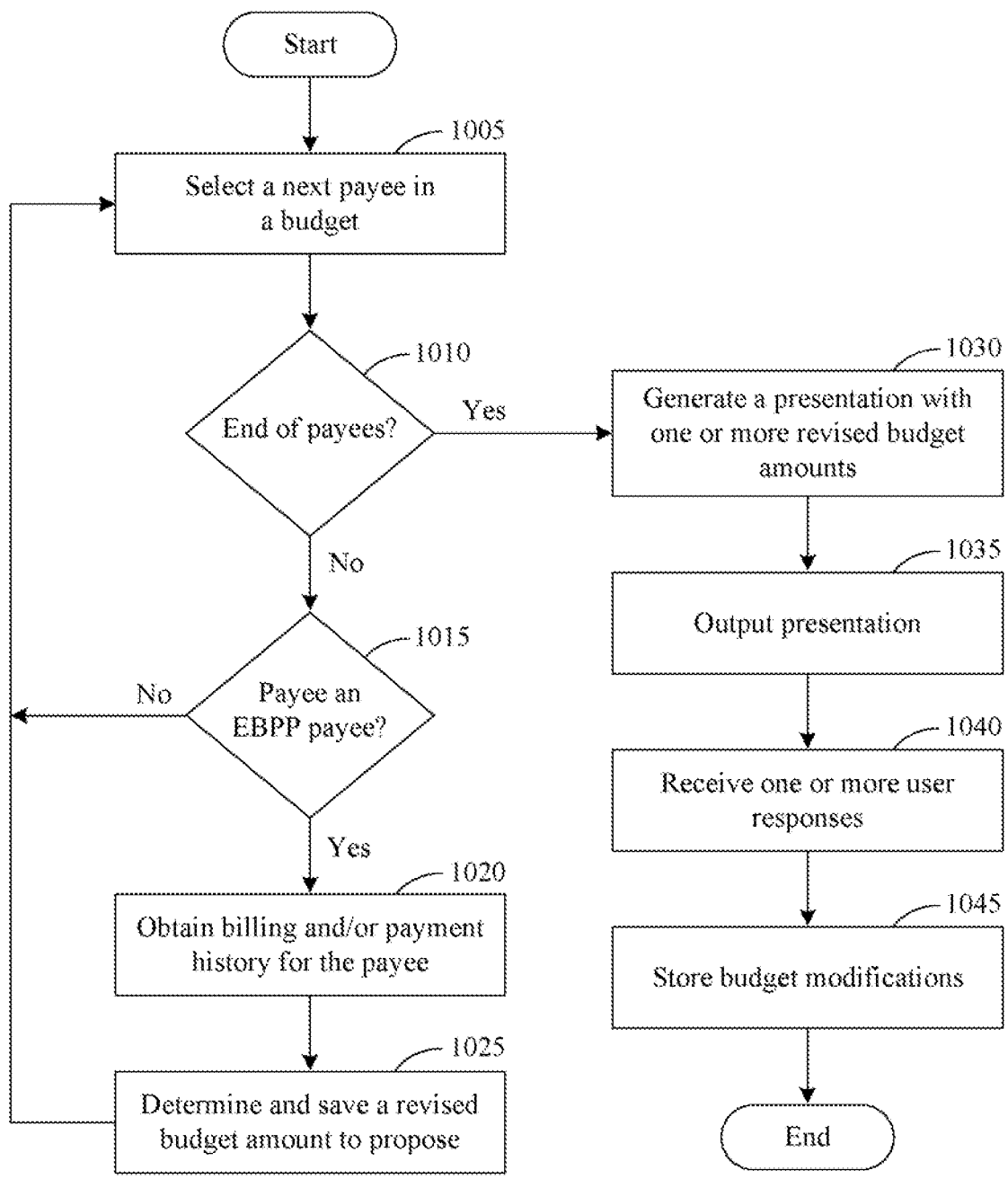
FIG. 10 is a flow diagram of an example method for updating a budget, according to an example embodiment of the invention.

FIG. 10 is a flow diagram of an example method 1000 for updating a budget, according to an example embodiment of the invention. The operations included in the method 1000 may be one example of the operations performed at block 230 of the method 200 illustrated in FIG. 2. As such, the operations of the method 1000 may be performed by one or more budget computers associated with a budget system, such as the one or more budget computers 115 associated with the budget system 105 of FIG. 1. The method 1000 may begin at block 1005.

At block 1005, a next payee included in a desired budget may be selected for processing. At block 1010, a determination may be made as to whether an end of the payees included in the budget has been reached. If it is determined at block 1010 that the end of the payees has been reached, then operations may continue at block 1030 described in greater detail below. However, if it is determined at block 1010 that the end of the payees has not been reached, then operations may continue at block 1015.

At block 1015, a determination may be made as to whether the selected payee has a link to an associated EBPP payee of the user, such as an EBPP payee established at a suitable EBPP system (e.g., the EBPP system 110 illustrated in FIG. 1). For example, a determination may be made as to whether the selected payee has been established as an EBPP payee of user at the EBPP system 110. Additionally, a determination may be made as to whether a link has been established between the budget system 105 and the EBPP system 110 for the selected payee. If it is determined at block 1015 that an EBPP link has not been established for the selected payee, then operations may continue at block 1005, and a next payee included in the budget may be selected for processing. If, however, it is determined at block 1015 that an EBPP link has been established for the selected payee, then operations may continue at block 1020.

At block 1020, information associated with the selected payee, such as billing and/or payment history information, may be obtained from the EBPP system 110. As desired, information may be obtained for a wide variety of different time periods and/or predetermined numbers of prior bills and/or payments. For example, information may be obtained for the previous three months, six months, one year, or for any other suitable time period, such as a time period calculated from a last budget update for the payee. As another example, information may be obtained for the previous five, ten, or some other number of bills received and/or payments made. In certain embodiments, parameters for obtaining payee information may be established by the user.

At block 1025, the obtained information for the payee (e.g., billing information, payment history information, etc.) may be analyzed and/or processed. Based at least in part upon an analysis of the obtained information, one or more proposed modifications to the user's budget may be generated. For example, a revised proposed budget amount for the selected payee may be calculated utilizing the obtained information, the previously received information for the payee, and/or the existing budget amount for the payee. A wide variety of suitable calculations and/or techniques may be utilized to determine a proposed budget amount. For example, a proposed budget amount may be calculated based upon an average of historical payment and/or billing amounts. As another example, a proposed budget amount may be calculated based upon a historical trend. For example, proposed utility amounts (e.g., power, gas, etc.) may be determined based upon a particular season and/or month (e.g., an amount paid in previous years for the given month). Once generated, a proposed modification may be saved or stored in memory. Operations may then continue at block 1005, and a next payee may be selected for processing.

At block 1030, it may be determined that the end of the payees included in the budget has been reached. Additionally, based upon the processing performed for the payees, one or more revised budget amount proposals may be available. One or more presentations may be generated based at least in part upon the revised budget amount proposals. If the user is in session with the budget system 105 (e.g., the user is logged into a budget service provided by the budget system), then the one or more presentations may be transmitted or otherwise output for display to the user at block 1035. If, however, the user is not in session, then the one or more presentations may be stored or saved for subsequent transmission or output to the user. As desired, one or more email messages, short message service ("SMS") messages, and/or other messages indicating that revised budget amount proposals are available may be communicated to the user. In certain embodiments, a message may include a selectable indicator or link to the budget system 105. Once a communications session is established between the budget system 105 and a user device, such as the user device 130 illustrated in FIG. 1, and/or once the user has requested predetermined budget services, the one or more presentations may be transmitted or otherwise output for display at block 1035.

At block 1040, one or more user responses to the revised budget amount proposals may be received by the budget system 105. A user may accept, reject, override, and/or modify a proposed budget amount. The budget system 105 may receive the one or more user responses and determine whether any of the budget amounts included in the user's budget should be modified. At block 1045, the user's budget may be updated, and the updated budget may be stored or saved. In certain embodiments, the income for the user may be tracked against the budget amounts that are accepted and/or modified by the user. In this regard, a comparison of the user's income and expenses may be presented by the budget system 105. The user may utilize this data to determine whether discretionary income is available to allocate to the budget and/or whether the user should reduce one or more budget amounts. Additionally, as desired, one or more alerts (e.g., excessive spending alerts) may be generated and/or transmitted or otherwise output for presentation to the user.

The method 1000 may end following block 1045.

Figure 11:
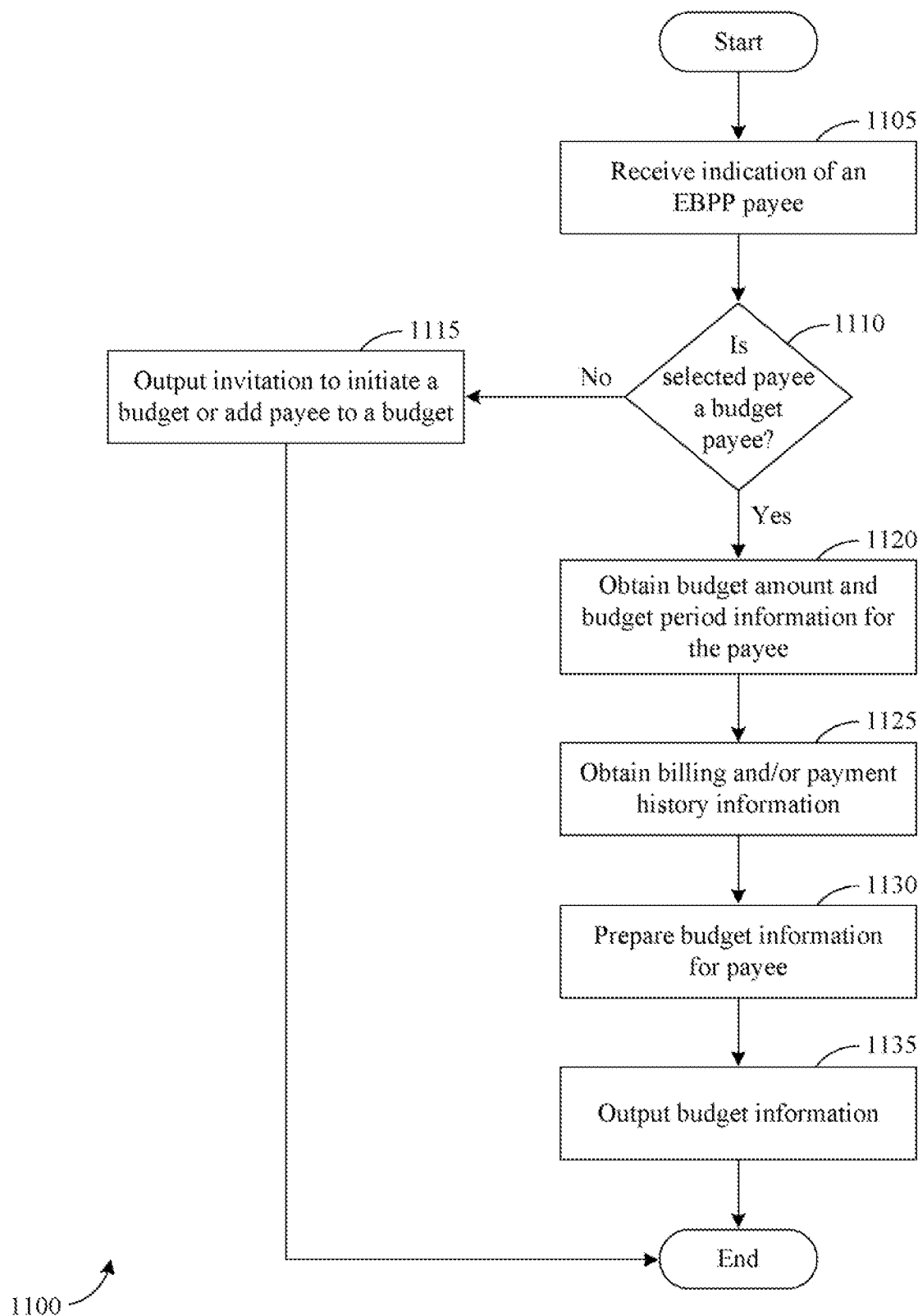
FIG. 11 is a flow diagram of an example method for displaying budget information in association with an electronic billing service, according to an example embodiment of the invention.

In certain embodiments, an EBPP system, such as the EBPP system 110 illustrated in FIG. 1, may obtain budget information for a customer or user of the EBPP system 110. The EBPP system 110 may then present the budget information in association with one or more services provided by the EBPP system 110. FIG. 11 is a flow diagram of an example method 1100 for displaying budget information in association with an electronic billing service, according to an example embodiment of the invention. In certain embodiments, the operations of the method 1100 may be performed by one or more EBPP computers associated with an EBPP system, such as the one or more EBPP computers 120 associated with the EBPP system 110 of FIG. 1. The method 1100 may begin at block 1105.

At block 1105, the EBPP system 110 may receive a user indication or user selection of an EBPP payee. For example, the user may select or scroll over a payee included in an EBPP presentation output by the EBPP system 110, and the EBPP system 110 may receive an indication of the action. As another example, the user may enter payment information (e.g., a desired payment amount and/or a desired payment date) for an EBPP payee, and the EBPP system lip may identify a payee based at least in part upon the entered information.

At block 1110, a determination may be made as to whether the identified or selected EBPP payee is a budget payee for the user. In other words, a determination may be made as to whether a link exists between the EBPP payee and an associated budget payee included in a user budget maintained by a budget system, such as the budget system 105 illustrated in FIG. 1. In certain embodiments, the determination may be based upon an analysis of stored information associated with established links between EBPP payees for the user and budget payees for the user. In other embodiments, the EBPP system 110 may communicate a request to the budget system 105 to determine whether the EBPP payee is a budget payee for the user. The EBPP system 110 may then make its determination based upon a received response to the communicated request.

If it is determined at block 1110 that the selected EBPP payee is not a budget payee, then operations may continue at block 1115. At block 1115, one or more presentations may be generated that include invitations for the user to establish a budget utilizing the budget system 105 and/or to include the selected EBPP payee in a budget for the user. The generated presentations may be transmitted or otherwise output by the EBPP system 110 for display to the user. In certain embodiments, a user acceptance of an invitation may be received by the EBPP system 110 and/or by the budget system 105 (e.g., in the case of a user activation of a selectable link included in an invitation), and the received user acceptance may be processed in order to establish the requested budget function. Operations may then end following block 1115.

If, however, it is determined at block 1110 that the selected EBPP payee is a budget payee, then operations may continue at block 1120. At block 1120, budget information associated with the selected EBPP payee may be obtained. For example, the established link with the budget system 105 may be utilized to obtain budget information associated with the payee. A wide variety of different types of budget information may be obtained as desired in various embodiments, including, but not limited to, information associated with a budgeted amount for the payee and/or information associated with a budget period for the payee.

At block 1125, which may be optional in certain embodiments of the invention, billing and/or payment history information may be obtained and/or accessed for the EBPP payee. A wide variety of information may be obtained as desired, such as pending payment information, information associated with previous payments, current billing information, and/or information associated with previous billing periods. As desired, an obtained budget amount and obtained billing and/or payment history information may be utilized by the EBPP system 110 to calculate a revised budget amount proposal for the user. For example, a revised budget amount proposal may be calculated in a similar manner as that described above with reference to block 1025 of FIG. 10.

At block 1130, one or more presentations or representations of budget information and/or budget proposals (e.g., revised budget amount proposals, etc.) may be generated. For example, a presentation of budgeted amounts for the payee may be prepared. As another example, a presentation of a comparison of a budgeted amount to a billed amount, paid amount, average billed amount, or other calculated amount may be prepared. As yet another example, a presentation of a total budgeted amount and a comparison of the total budgeted amount to a total billed or paid amount for one or more payees of the user may be prepared. As desired, color coding may be utilized to indicate whether the user is above or below a budgeted amount for a biller and/or a total budgeted amount for any number of given budget periods. Additionally, one or more links may be generated that facilitate the revision of budgeted amounts at the budget system 105. Indeed, a wide variety of different types of presentations may be generated as desired in various embodiments of the invention.

At block 1135, one or more generated presentations may be transmitted or otherwise output for display to the user. For example, one or more generated presentations may be transmitted as Web pages and/or pop-up windows. In this regard, budget information may be presented by the EBPP system 110 in association with EBPP information.

The method 1100 may end following either block 1115 or block 1135.

Figure 12:
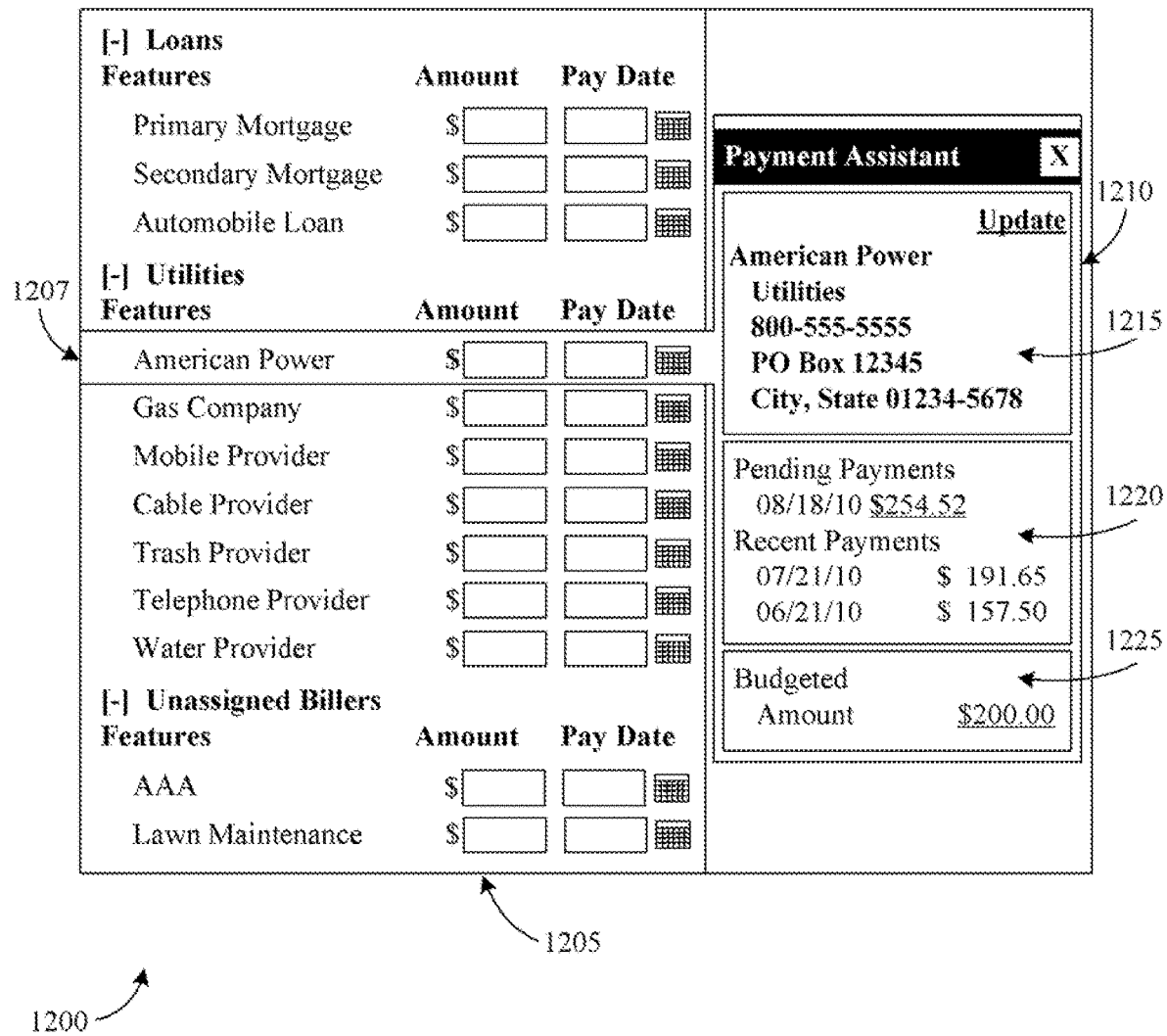
FIG. 12 is an example graphical user interface that may be utilized to display budget information in association with an electronic billing service, according to an illustrative embodiment of the invention.

FIG. 12 is an example graphical user interface 1200 or presentation that may be utilized to display budget information in association with an electronic billing service, according to an illustrative embodiment of the invention. The presentation 1200 is one example presentation that may be transmitted or otherwise output by a Payment Assistant function provided in association with an EBPP service. For example, a user of an EBPP system, such as the EBPP system 110 illustrated in FIG. 1, may select various EBPP payees, and budget information may be displayed in association with the selected payees. For example, the EBPP system 110 may utilize an established link to obtain budget information from a budget system, such as the budget system 105 illustrated in FIG. 1, and at least a portion of the budget information may be transmitted or otherwise output for display to the user.

With reference to FIG. 12, the presentation 1200 may include information 1205 associated with any number of EBPP payees for the user. Based upon a received user indication of a particular EBPP payee 1207 (e.g., a scrolling over or user selection of an EBPP payee), additional information 1210 for the payee may be presented to the user. For example, additionally information 1210 may be presented in a pop-up window. A wide variety of different types of additional information 1210 may be presented as desired in various embodiments of the invention, such as contact information 1215 for the payee (e.g., a payee name, a payee address, etc.), payment information 1220 for the payee (e.g., a pending payment amount, information associated with recent payments, average payment amounts, etc.), and/or budget information 1225 associated with the payee. As desired, a wide variety of different types of budget information 1225 and/or budget invitations may be presented, such as a budgeted amount for the payee, a revised proposed budgeted amount, a comparison of a budgeted amount to a payment history, a comparison of a budgeted amount to a current billed and/or paid amount, etc.

A wide variety of different types of presentations may be utilized in association with various embodiments of the invention to display budget information in association with EBPP information. The presentation 1200 illustrated in FIG. 12 is merely one example of a suitable presentation that may be utilized.

The operations described and shown in the methods 200, 300, 400, 600, 800, 1000, 1100 of FIGS. 2-4, 6, 8, 10, and 11 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-4, 6, 8, 10, and 11 may be performed.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Many modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for integrating disparate systems using a bi-directional link, the method comprising:

identifying, by a computerized budget system, a budget category for presentation to a user of the computerized budget system, wherein the budget category is associated with the computerized budget system;

obtaining, by the computerized budget system from an electronic bill payment and presentment (EBPP) system, information associated with the user comprising (i) first EBPP payee information for an EBPP payee of the EBPP system and at least one of (ii) EBPP payment history information for the EBPP payee or (iii) EBPP bill history information for the EBPP payee;

identifying, by the computerized budget system based at least in part on the first EBPP payee information, the EBPP payee of the EBPP system as a budget payee of the computerized budget system and associated with the budget category, wherein the EBPP payee of the EBPP system and the budget payee of the computerized budget system are the same payee;

calculating, by the computerized budget system based at least in part on the budget payee and the at least one of the EBPP payment history information or the EBPP bill history information, a proposed budget amount associated with the budget category;

transmitting, by the computerized budget system via a network interface for presentation to the user, a proposed budget presentation comprising the proposed budget amount;

establishing, by the computerized budget system, a bi-directional link between the budget payee of the computerized budget system and the EBPP payee of the EBPP system, wherein (i) the bi-directional link integrates the computerized budget system with the EBPP system for the EBPP payee and integrates the EBPP system with the computerized budget system for the budget payee, (ii) the integration enables the EBPP system to receive information associated with the budget payee from the computerized budget system, and (iii) the integration enables the computerized budget system to receive second EBPP payee information associated with the EBPP payee from the EBPP system, and (iv) the bi-directional link is established in response to electronic approval by the user requested via a pop-up window;

determining, by the computerized budget system, that the bi-directional link has been established between the budget payee of the computerized budget system and the EBPP payee of the EBPP system;

in response to the determination that the bi-directional link has been established between the budget payee of the computerized budget system and the EBPP payee of the EBPP system, receiving, by the computerized budget system from the EBPP system and using the bi-directional link between the budget payee of the computerized budget system and the EBPP payee of the EBPP system, the second EBPP information associated with the EBPP payee;

calculating, by the computerized budget system and based at least in part on the second EBPP payee information received from the EBPP system, a revised proposed budget amount associated with the budget category; and transmitting, by the computerized budget system via the network interface for presentation to the user, a revised proposed budget amount presentation comprising the revised proposed budget amount, wherein the revised proposed budget amount presentation comprises information associated with the budget payee from the computerized budget system and information associated with the EBPP payee from the EBPP system.

2. The method of claim 1, wherein obtaining, from the EBPP system, the information associated with the user includes:
transmitting, by the computerized budget system to the EBPP system, a request for information associated with the user; and
receiving, by the computerized budget system from the EBPP system in response to the request, the information associated with the user.

3. The method of claim 1, wherein the information associated with the user obtained from the EBPP system includes the EBPP payment history information and calculating a proposed budget amount comprises at least one of (i) identifying at least one EBPP payment history amount associated with the EBPP payment history information, (ii) determining an average amount based at least in part on a plurality of payment history amounts associated with the EBPP payment history information, (iii) adjusting an amount derived from the EBPP payment history information for differences between a payment frequency and a budget period, or (iv) rounding an amount derived from the EBPP payment history information to a desired degree of significance.

4. The method of claim 1, further comprising:
receiving, by the computerized budget system, a user response to the proposed budget presentation; and
storing, by the computerized budget system based at least in part on the received user response, an approved budget amount associated with the budget payee.

5. The method of claim 4, further comprising:
generating, by the computerized budget system, a budget presentation for the user based at least in part on the approved budget amount; and
transmitting, by the computerized budget system via the network interface for display to the user, the generated budget presentation.

6. The method of claim 5, further comprising:
receiving, by the computerized budget system via the network interface in response to transmitting the generated budget presentation, a user selection of the budget payee;
obtaining, by the computerized budget system from the EBPP system in response to the received user selection, third EBPP payee information and payment information associated with the EBPP payee; and
transmitting, by the computerized budget system via the network interface for display to the user, at least a portion of the third EBPP payee information and payment information.

7. The method of claim 1, wherein the budget payee comprises a first budget payee and the proposed budget amount comprises a first proposed budget amount, and wherein the method further comprises:
identifying, by the computerized budget system, a second budget payee associated with the identified budget category; and
wherein calculating the proposed budget amount associated with the budget category is further based at least in part on the second budget payee.

8. The method of claim 1, wherein the budget category comprises a first budget category and the budget payee comprises a first budget payee, and wherein the method further comprises:
identifying, by the computerized budget system, a second budget payee of the user, the second budget payee associated with a second budget category.

9. The method of claim 8, wherein the proposed budget further comprises an indication of the second budget category and an indication of the second payee.

10. The method of claim 8, wherein identifying the second budget payee comprises:
obtaining, by the computerized budget system, credit report information associated with the user; and
determining, by the computerized budget system at least in part on an analysis of the obtained credit report information, a candidate payee of the user for the second budget category.

11. The method of claim 8, wherein identifying the second budget payee comprises:
identifying, by the computerized budget system, a demographic attribute associated with the user; and
determining, by the computerized budget system based at least in part on the identified demographic attribute, a candidate payee of the user for the second budget category.

12. The method of claim 8, wherein identifying the second budget payee comprises identifying a second budget payee based at least in part upon a received user identification associated with the second budget payee.

13. The method of claim 8, further comprising:
determining, by the computerized budget system, that the second budget payee has not been established at the EBPP system as an EBPP system payee of the user; and
transmitting, by the computerized budget system via the network interface for presentation to the user, an invitation to add the second budget payee as an EBPP system payee of the user.

14. The method of claim 8, further comprising:
determining, by the computerized budget system, that the second budget payee is a biller capable of electronically delivering bills through the EBPP system;
determining, by the computerized budget system, that the user has not activated the second budget payee as an electronic biller at the EBPP system; and
transmitting, by the computerized budget system via the network interface for presentation to the user, an invitation to add the second budget payee as an electronic biller of the user.

15. The method of claim 8, further comprising:
determining, by the computerized budget system, that a recurring payment on behalf of the user has not been established for the second budget payee by the billing system; and
transmitting, by the computerized budget system via the network interface for presentation to the user, an invitation to establish a recurring payment for the second budget payee.

16. The method of claim 1, further comprising:
obtaining, by the computerized budget system from a financial system, historical deposit information associated with a financial account of the user;
calculating, by the computerized budget system based at least in part on the historical deposit information, a proposed income amount for the user;

transmitting, by the computerized budget system via the network interface for presentation to the user, the proposed income amount;

receiving, by the computerized budget system via the network interface, a user response to the proposed income amount; and storing, by the computerized budget system based at least in part on the received user response, an approved income amount associated with the user.

17. The method of claim 1, further comprising:

identifying, by the computerized budget system, at least one service of the EBPP system available for the payee; and transmitting, by the computerized budget system via the network interface for presentation to the user, an invitation to activate the at least one service of the EBPP system.

18. The method of claim 17, wherein the at least one service comprises one or more of (i) an electronic bill presentment service, (ii) a recurring payment service, or (iii) a one time payment service.

19. The method of claim 1, wherein the proposed budget further comprises an indication of the budget payee.

20. A computerized budget system integrated with electronic bill payment and presentment (EBPP) system using a bi-directional link, comprising:

at least one memory configured to store computer-executable instructions;

at least one communications interface; and at least one processor configured to access the at least one memory and execute the computer-executable instructions to:

identify a budget category for presentation to a user of the computerized budget system, wherein the budget category is associated with the computerized budget system;

obtain, from an the EBPP system, information associated with the user comprising (i) first EBPP payee information for an EBPP payee of the EBPP system and at least one of (ii) EBPP payment history information for the EBPP payee or (iii) EBPP bill history information for the EBPP payee;

identify, based at least in part on the first EBPP payee information, the EBPP payee of the EBPP system as a budget payee of the computerized budget system and associated with the budget category, wherein the EBPP payee of the EBPP system and the budget payee of the computerized budget system are the same payee;

calculate, based at least in part on the budget payee and the at least one of the EBPP payment history information or the EBPP bill history information, a proposed budget amount associated with the budget category;

transmit, for presentation to the user, a proposed budget presentation comprising the proposed budget amount;

establish a bi-directional link between the budget payee of the computerized budget system and the EBPP payee of the EBPP system, wherein (i) the bi-directional link integrates the computerized budget system with the EBPP system for the EBPP payee and integrates the EBPP system with the computerized budget system for the budget payee, (ii) the integration enables the EBPP system to receive information associated with the budget payee from the computerized budget system, and (iii) the integration enables the computerized budget system to receive second EBPP payee information associated with the EBPP payee from the EBPP system, and (iv) the bi-directional link is established in response to electronic approval by the user requested via a pop-up window;

determine that the bi-directional link has been established between the budget payee of the computerized budget system and the EBPP payee of the EBPP system;

in response to the determination that the bi-directional link has been established between the budget payee of the computerized budget system and the EBPP payee of the EBPP system, receive, from the EBPP system and using the bi-directional link between the budget payee of the computerized budget system and the EBPP payee of the EBPP system, second EBPP associated with the EBPP payee;

calculate, based at least in part on the second EBPP payee information received from the EBPP system, a revised proposed budget amount associated with the budget category; and transmit, via the at least one communications interface for presentation to the user, a revised proposed budget amount presentation comprising the revised proposed budget amount, wherein the revised proposed budget amount presentation comprises information associated with the budget payee from the computerized budget system and information associated with the EBPP payee from the EBPP system.

21. The system of claim 20, wherein the EBPP system comprises an external system comprising one or more computers, and wherein the system further comprises:

at least one communications interface configured to facilitate communications with the one or more computers associated with the EBPP system.

22. A computer program product comprising at least one non-transitory computer-readable storage medium having computer-executable instructions the computer-executable instructions, when executed by a computerized budget system integrated with electronic bill payment and presentment (EBPP) system using a bi-directional link, configured to cause the computerized budget system to:

identify a budget category for presentation to a user of the computerized budget system, wherein the budget category is associated with the computerized budget system;

obtain, from the EBPP system, information associated with the user comprising (i) first EBPP payee information for an EBPP payee of the EBPP system and at least one of (ii) EBPP payment history information for the EBPP payee or (iii) EBPP bill history information for the EBPP payee;

identify, based at least in part on the first EBPP payee information, the EBPP payee of the EBPP system as a budget payee of the computerized budget system and associated with the budget category, wherein the EBPP payee of the EBPP system and the budget payee of the computerized budget system are the same payee;

calculate, based at least in part on the budget payee and the at least one of the EBPP payment history information or the EBPP bill history information, a proposed budget amount associated with the budget category;

transmit, for presentation to the user, a proposed budget presentation comprising the proposed budget amount;

establish a bi-directional link between the budget payee of the computerized budget system and the EBPP payee of the EBPP system, wherein (i) the bi-directional link integrates the computerized budget system with the EBPP system for the EBPP payee and integrates the EBPP system with the computerized budget system for the budget payee, (ii) the integration enables the EBPP system to receive information associated with the budget payee from the computerized budget system, and (iii) the integration enables the computerized budget system to receive second EBPP payee information associated with the EBPP payee from the EBPP system, and (iv) the bi-directional link is established in response to electronic approval by the user requested via a pop-up window;

determine that the bi-directional link has been established between the budget payee of the computerized budget system and the EBPP payee of the EBPP system;

in response to the determination that the bi-directional link has been established between the budget payee of the computerized budget system and the EBPP payee of the EBPP system, receive, rom the EBPP system and using the bi-directional link between the budget payee of the computerized budget system and the EBPP payee of the EBPP system, second EBPP associated with the EBPP payee;

calculate, based at least in part on the second EBPP payee information received from the EBPP system, a revised proposed budget amount associated with the budget category; and transmit, for presentation to the user via the at least one communications interface, a revised proposed budget amount presentation comprising the revised proposed budget amount, wherein the revised proposed budget amount presentation comprises information associated with the budget payee from the computerized budget system and information associated with the EBPP payee from the EBPP system.

* * * * *

UNITED STATES PATENT AND TRADEMARK OFFICE
CERTIFICATE OF CORRECTION

Page 1 of 1

PATENT NO. : 10,719,818 B2
APPLICATION NO. : 12/967434
DATED : July 21, 2020
INVENTOR(S) : Dickerson et al.

It is certified that error appears in the above-identified patent and that said Letters Patent is hereby corrected as shown below:

In the Claims

<u>Column 35</u>
Line 37 "obtain, from an the EBPP system" should read --obtain, from the EBPP system--

Signed and Sealed this
Twentieth Day of October, 2020

Andrei Iancu
*Director of the United States Patent and Trademark Office*